(12) United States Patent
Theado et al.

(10) Patent No.: US 9,070,123 B2
(45) Date of Patent: Jun. 30, 2015

(54) TRANSACTION SERVICES DATA SYSTEM

(75) Inventors: Brian P. Theado, Canal Winchester, OH (US); Khoa N. Nguyen, Westerville, OH (US); Lloyd S. Palmer, Jr., Hilliard, OH (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 827 days.

(21) Appl. No.: 13/332,422

(22) Filed: Dec. 21, 2011

(65) Prior Publication Data

US 2013/0166638 A1 Jun. 27, 2013

(51) Int. Cl.
- G06F 15/16 (2006.01)
- G06Q 20/00 (2012.01)
- G06Q 20/02 (2012.01)
- G06Q 20/42 (2012.01)

(52) U.S. Cl.
CPC ............ *G06Q 20/027* (2013.01); *G06Q 20/425* (2013.01)

(58) Field of Classification Search
None
See application file for complete search history.

(56) References Cited

U.S. PATENT DOCUMENTS

| 5,671,279 | A  | * | 9/1997 | Elgamal | 705/79 |
| 6,178,409 | B1 | * | 1/2001 | Weber et al. | 705/79 |
| 7,596,530 | B1 | * | 9/2009 | Glasberg | 705/64 |
| 2003/0120597 | A1 | * | 6/2003 | Drummond et al. | 705/43 |
| 2009/0215489 | A1 | * | 8/2009 | Kerdraon et al. | 455/558 |
| 2011/0016373 | A1 | * | 1/2011 | Teruyama et al. | 714/799 |
| 2012/0095905 | A1 | * | 4/2012 | Hodges | 705/39 |

\* cited by examiner

*Primary Examiner* — Brian P Whipple
*Assistant Examiner* — James Edwards

(57) ABSTRACT

A device may include a transaction web server. The transaction server may be configured to receive a hypertext markup language HTTP message that includes information sent from a transaction device, determine whether the message is a request to authorize a transaction or a request to settle a transaction, route a first portion of the HTTP message to a customer device to obtain an authorization from the customer device when the HTTP message is a request to authorize the transaction, and route a second portion of the HTTP message to the customer device to settle the transaction when the HTTP message is a request to settle a transaction.

20 Claims, 19 Drawing Sheets

TRANSACTION SERVICES DATA SYSTEM

BACKGROUND

Transaction services may generally include data communications over a network to support a secure transaction. Transaction services may be characterized by short sessions to support inquiry-and-response applications. Transaction applications may include, for example, credit/debit card authorization, automated teller machine (ATM) activity, insurance verification, and home health monitoring. Customers of transaction services may include payment processing entities.

DETAILED DESCRIPTION OF PREFERRED EMBODIMENTS

The following detailed description refers to the accompanying drawings. The same reference numbers in different drawings may identify the same or similar elements.

Transaction services may be provided to entities that need a network solution for short (e.g., typically less than 15 seconds) connections for their customers (e.g., merchants) to reach their hosts. A majority of traffic in transaction services can arise from credit or debit card transactions; but other types of traffic may also utilize these services, including insurance verification, home health monitoring, processing of fishing and hunting licenses, etc. Transaction services customers are typically referred to as "processors" or "hosts" that act as middle men between, for example, merchants on one end and banks or card marketing organizations (e.g., Visa®, Mastercard®, etc.) on the other end.

As described herein, a system may include one or more devices within a transaction services hub. The system may relay messages from/to transaction devices to transaction services customers and provide support functions that are related to relaying the messages. In relaying the messages, the system may process a hypertext transfer protocol (HTTP)/secure HTTP (HTTPS) message or another type of messages to obtain customer protocol messages (e.g., Visa II message), translate a customer protocol message into a HTTP/HTTPS message or another type of messages, and provide for efficient transport of the customer protocol message over a transport control protocol (TCP) session. In providing the support functions, the system may provide for failover of one or more devices/components, maintain logs, monitor routers and customers, collect data and provide transaction statistics, configure systems and devices, etc.

Figure 1:
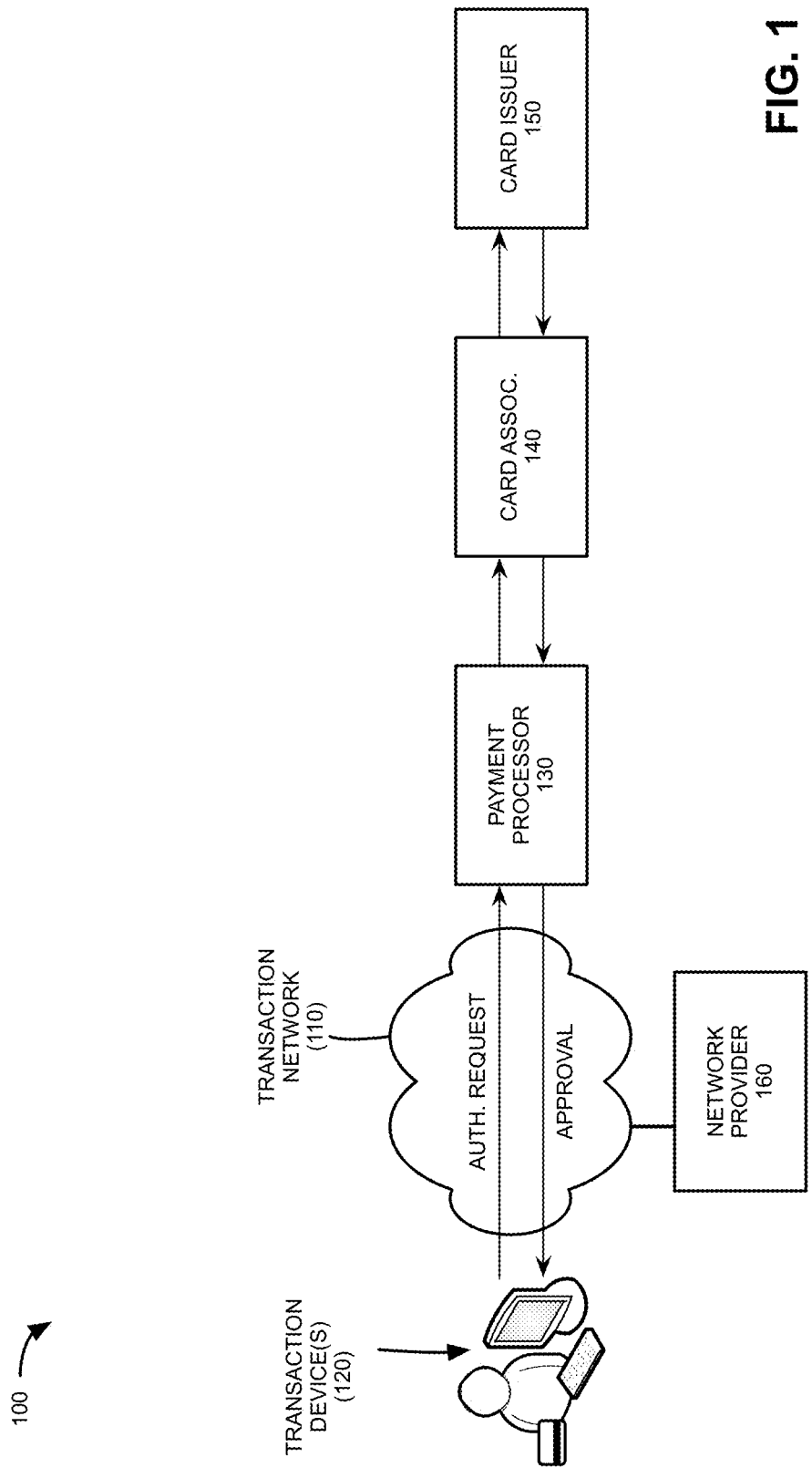
FIG. 1 is a diagram that illustrates an exemplary network in which systems and/or methods, described herein, may be implemented.

FIG. 1 is a diagram that illustrates an exemplary network 100 in which systems and/or methods described herein may be implemented. As shown in FIG. 1, network 100 may include a transaction network 110, a transaction device 120, a payment processor 130, a card association 140, a card issuer 150, and a network provider 160. Devices and/or networks of FIG. 1 may be connected via wired and/or wireless connections.

Transaction network 110 may facilitate data communications, such as credit card authorizations, between transaction device 120 and payment processor 130. Particularly, transaction network 110 may facilitate transactions characterized by short sessions, low bandwidth requirements, and quick call set-ups, for inquiry-response applications. Transaction network 110 may generally include one or more wired, wireless, and/or optical networks that are capable of receiving and transmitting data, voice and/or video signals. For example, transaction network 110 may include one or more public switched telephone networks (PSTNs) or another type of switched network. Transaction network 110 may also include one or more wireless networks and may include a number of transmission towers for receiving wireless signals and forwarding the wireless signals toward the intended destination. Transaction network 110 may further include one or more satellite networks, one or more packet switched networks, such as an Internet protocol (IP) based network, a local area network (LAN), a wide area network (WAN), a personal area network (PAN), a WiFi network, a Bluetooth network, an intranet, the Internet, or another type of network that is capable of transmitting data. In some implementations, transaction network 110 may include a private network controlled by, for example, a telecommunications company (e.g., network provider 160) that provides telephone and/or data access to transaction device 120. In another implementation, transaction network 110 may include a public network, such as the Internet, or a combination of public and private networks. Transaction network 110 is described further in connection with, for example, FIGS. 2 and 3.

Transaction device(s) 120 may participate in a transaction, such as a purchase of goods or services from a merchant or other entity associated with transaction device 120. Transaction device 120, for example, may include an electronic cash register or point-of-sale system at a retail location or another device/system that is able to receive payment information and/or other information from a user and/or a payment card (e.g., credit card, identity card, etc.). Additionally, or alternatively, transaction device 120 may include a personal computer, a laptop computer, a tablet or "pad" computer, a personal communications system (PCS) terminal (e.g., that may combine a cellular radiotelephone with data processing and data communications capabilities), a personal digital assistant (PDA, e.g., that can include a radiotelephone, a pager, Internet/intranet access, etc.), a smartphone, or other types of computation and/or communication devices. In one implementation, transaction device 120 may include any device (e.g., an IP-based device) that enables a user to access the Internet and/or communicate with other devices. In one implementation, transaction device 120 may communicate with payment processor 130 via transaction network 110 when a transaction (e.g., a credit card purchase, point-of-sale transaction, etc.) is taking place.

Payment processor 130 (also referred to as a "host") may include one or more devices that route an authorization/transaction request from transaction device 120 to a particular card association 140. Payment processor 130 may be included, for example, within a customer's private network. In one implementation, payment processor 130 may receive, via transaction network 110, an inquiry (e.g., an authorization request) from transaction device 120 and provide a response (e.g., an approve/decline decision from card issuer 150) to transaction device 120 to facilitate a data transaction.

Card association 140 may include one or more devices that belong to or are associated with, for example, an entity formed to administer and promote credit cards (e.g., Visa, Master Card, etc.).

Card issuer 150 may include one or more devices that belong to or are associated with, for example, a bank or other institution that authorizes a transaction (e.g., verifies that sufficient funds are associated with a credit card, verifies access rights, etc.). In one implementation, card issuer 150 may receive an authorization request that originates from transaction device 120 and provide a response and/or authorization code to approve a transaction.

Network provider 160 may include one or more devices that belong to or are associated with an entity that provides and manages all or a portion of transaction network 110. Network provider 160 may receive fees (e.g., a per-transaction fee, flat fee, etc.) for providing transaction services via transaction network 110.

According to an implementation described herein, a merchant may utilize transaction device 120 to initiate transaction services (e.g., a credit card authorization request), via transaction network 110, originating using either a dial (e.g., voice network) or non-dial (e.g., Internet) connection. Regardless of the originating connection from transaction device 120, transaction network 110 may provide a single interface to payment processor 130.

The exemplary configuration illustrated in FIG. 1 is provided for simplicity. It should be understood that a typical network may include more or fewer devices than illustrated in FIG. 1. For example, network 100, may include thousands of transaction devices 120 via which transactions may be made. In addition, network 100 may include additional elements, such as switches, gateways, routers, etc., that aid in routing data. Also, various functions are described below as being performed by particular components in network 100. In other implementations, various functions described as being performed by one device may be performed by another device or multiple other devices, and/or various functions described as being performed by multiple devices may be combined and performed by a single device.

Figure 2:
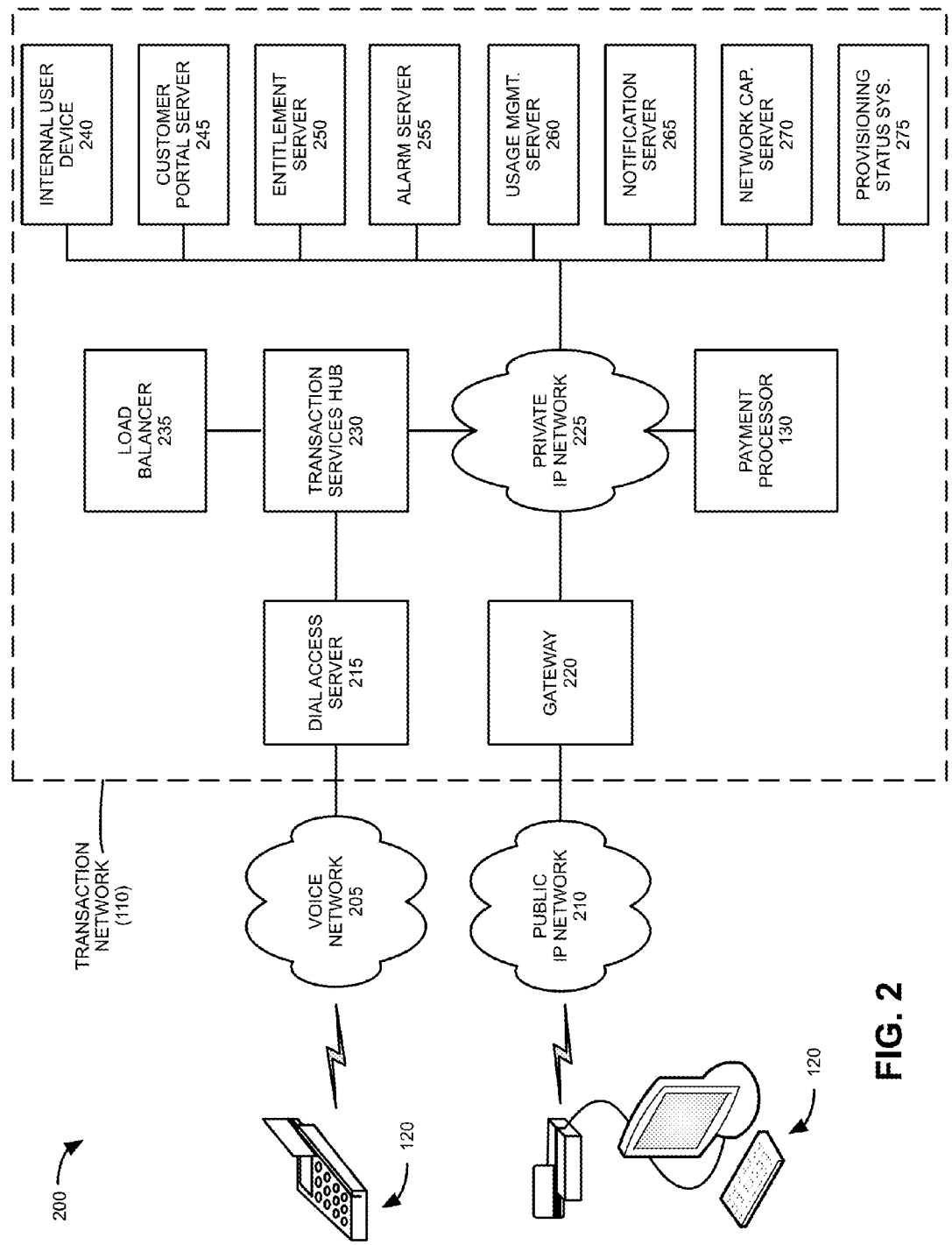
FIG. 2 is a diagram that illustrates additional details of a portion of the network of FIG. 1.

FIG. 2 provides a diagram of a portion 200 of network 100. As shown in FIG. 2, network portion 200 may include transaction devices 120, payment processor 130, a voice network 205, a public IP network 210, a dial access server 215, a gateway 220, a private IP network 225, a transaction services hub 230, a load balancer 235, an internal user device 240, a customer portal server 245, an entitlement server 250, an alarm server 255, a usage management server 260, a notification server 265, a network capacity server 270, and a provisioning status system 275. Transaction devices 120 and payment processor 130 may include features described above in connection with FIG. 1.

Voice network 205 may transfer voice traffic and/or data traffic. For example, voice network 205 may include a PSTN, a domestic toll-free voice network, and/or an international toll-free voice network.

Public IP network 210 may include a wide area network, an intranet, or a combination of networks that support IP communications. Public IP network 210 may include, for example, an untrusted network, such as the Internet. Public IP network 210 may further include transport and/or network devices such as routers, switches, and/or firewalls.

Dial access server 215 may include one or more devices, for example, to receive circuit-based signals and demodulate voice-band data of the circuit-based signals. The dial access server 215 may extract IP packets for routing (e.g., via a TCP connection) to the appropriate destination, such as transaction services hub 230.

Gateway 220 may include a typical gateway (e.g., to another network), a router, a switch, a firewall, a network interface card (NIC), a hub, a bridge, a proxy server, an optical add-drop multiplexer (OADM), or some other type of device that provides an interface between different networks. In one implementation, gateway 220 may include a hyper-text transfer protocol (HTTP) gateway or a secure socket layer (SSL) gateway to act as intermediary between public IP network 210 and private IP network 225.

Private IP network 225 may provide network services, such as a service for data transfers, voicemail, call blocking, calling card, audio, and/or network conferencing, etc. In some implementations, private IP network 225 may provide redundancy and/or the ability to distribute network loads. For example, private IP network 225 may include an IP network or a multiprotocol label switching (MPLS) network implementing an Interior Gateway Protocol (IGP) or another protocol that implements a minimum cost end-to-end path for routing between nodes. Private IP network 225 may provide one or more interface options to payment processor 130 (e.g., residing on a local customer network).

Transaction services hub 230 may manage transactions from transaction device 120 via voice network 205 and/or from transaction device 120 via public IP network 210 (via gateway 220 and private IP network 225). Transaction services hub 230 may establish/maintain connectivity (e.g., secure TCP/IP sessions) with multiple payment processors 130, may route particular transaction authorization requests from a transaction device 120 to the appropriate payment processor, and may return responses (e.g., from payment processor 130) to the originating transaction device 120. For example, transaction services hub 230 may maintain a persistent socket connection (e.g., multiplexing user sessions over a single TCP session) to payment processor 130, non-persistent socket connections; multiple interfaces to multiple payment processors (e.g., with load balancing and/or failover services), support proprietary host protocols, TCP/IP interfaces, X.25 interfaces, etc. Transaction services hub 230 may also collect data regarding the transactions and provide an interface to retrieve reports based on the collected data.

Load balancer 235 may receive transaction services requests and load balance the requests over devices in transaction services hub. For example, load balancer 235 may forward a received transaction services request to a device within transaction services hub 230 based on available resources (e . . . , processing time), geography, etc. For example, in one implementation, transaction services hub may include multiple redundant components (e.g., with geographic diversity) to enable seamless failover if a particular connection between payment processor 130 and transaction services hub 230 fails.

Generally, internal user device 240, customer portal server 245, entitlement server 250, alarm server 255, usage management server 260, notification server 265, network capacity server 270 and provisioning status system 275 may provide various interfaces to transaction services hub 230. In one implementation, each of internal user devices 240, customer portal server 245, entitlement server 250, alarm server 255, usage management server 260, notification server 265, network capacity server 270, and provisioning status system 275 may be integrated with other systems/services provided by network provider 160. For example, one or more of user device 240, customer portal server 245, entitlement server 250, alarm server 255, usage management server 260, notification server 265, network capacity server 270, and provisioning status system 275, and may provide access to information from multiple services (e.g., wireless services, Internet services, telephone services, etc.) besides transaction services.

User device 240 may provide secure internal access to transaction services hub 230. User device 240 may, for example, allow users (e.g., a network administrator) to communicate with components of transaction services hub 230 via private secure connections. Users may use user device 240 to submit configuration settings, service level agreement (SLA) information, provisioning, etc. related to a particular payment processor 130.

Customer portal server 245 may provide limited external access to transaction services hub 230. For example, customer portal server 245 may enable an authorized customer to access reporting data, residing in transaction services hub 230, that relates to a particular host (e.g., payment processor 130). In one implementation, customer portal server 245 may provide a common web-based interface to access multiple types of services (e.g., transaction services and other services). Access to services via customer portal server 245 may be restricted for example to users with registered accounts and secure passwords.

Entitlement server 250 may control which users (or user accounts) are permitted to access particular services. For example, entitlement server 250 may provide to transaction services hub 230 a file or list of user accounts that are authorized to access particular components of transaction services hub 230 (e.g., via internal user device 240 or customer portal server 245). In one implementation, entitlement server 250 may receive lists of authorized internal and/or external users from another device, such as a device associated with a subscription/account system.

Alarm server 255 may track and disperse alarm information relating to transaction services hub 230. For example, if transaction services hub 230 identifies a problem (e.g., a failed link with a payment processor 130), transaction services hub 230 may signal alarm server 255 to generate alarms to appropriate monitoring systems and/or ticketing systems. In one implementation, alarm server 255 may also consolidate and/or correlate alarms from multiple services (e.g., wireless services, Internet services, and/or transaction services).

Usage management server 260 may track system usage by customers. For example, usage management server 260 may collect transaction statistics from transaction services hub 230 to generate customer invoices. Notification server 265 may generate notifications (e.g., email, text messages, etc.) for customers and/or internal users. For example, notification server 265 may receive indications of service interruptions (e.g., scheduled maintenance, outages, etc.) and automatically send notifications to particular customer accounts.

Network capacity server 270 may assign and track telephone numbers (e.g., tool-free dial numbers) with particular customers. Provisioning status system 275 may track availability of network and/or system resources to support transaction services for particular customers. For example, provisioning status system 275 may track installation of new services, bandwidth availability, ports, paths and/or other information required to support service level agreements with customers.

Although FIG. 2 shows exemplary components of network portion 200, in other implementations, network portion 200 may include fewer, different, differently-arranged, or additional components than those depicted in FIG. 2. Alternatively, or additionally, one or more components of network portion 200 may perform one or more other tasks described as being performed by one or more other components of network portion 200.

Figure 3:
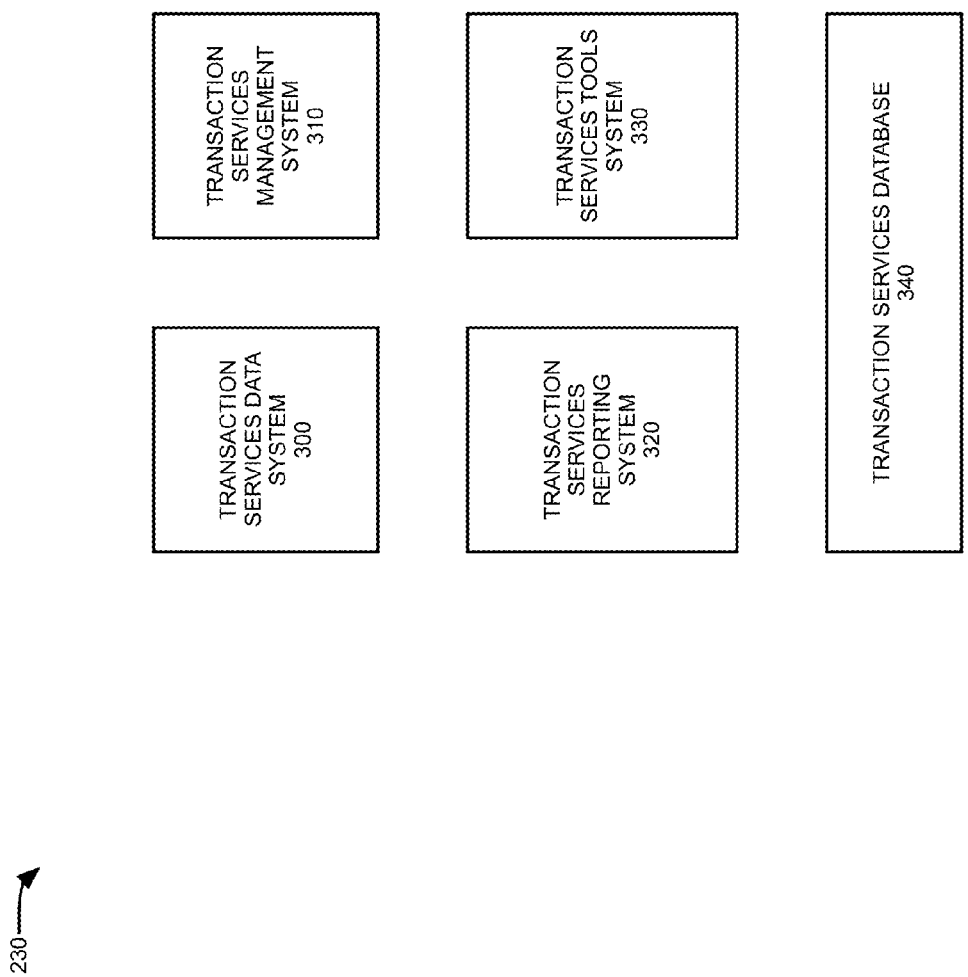
FIG. 3 is a diagram that illustrates components of the transaction services hub of FIG. 2.

FIG. 3 is a diagram that illustrates components of transaction services hub 230. As shown in FIG. 3, transaction services hub 230 may include a transaction services data system 300, a transaction services management system 310, a transaction services reporting system 320, a transaction services tools system 330, and a transaction services database 340.

Transaction services data system 300 may generally be the primary component of transaction services hub 230 for processing customer transactions. Transaction services data system 300 may manage customer traffic (e.g., relay messages relating to transaction services) and provide support functions that are associated with the management of customer traffic. In providing the support functions, transaction services data system 300 may communicate with other components of transaction services hub 230 (e.g., transaction services management system 310, transaction services reporting system 320, etc.), for example, to receive configuration settings and provide transaction statistics. For example, transaction services data system 300 may log information (e.g., origination source, time, etc.) about voice network transaction requests (e.g., via voice network 205) and/or an IP network transaction requests (e.g., via 210) and send the logged information to transaction services tools system 330 and/or transaction services tools database 340. In one implementation, transaction services data system 300 may collect logged information into various data files and push them to the transaction services tools system 330. Logged information may include usage detail records; session detail records; application status records; alarm detail files; and/or log files, crash dumps, or core files from transaction services data system 300 applications. Transaction services data system 300 may also monitor the health status of customer hosts (e.g., each payment processor 130) and gather data related to each processed transaction.

Transaction services management system 310 may provide an internal portal (e.g., a Web-based system for internal users of network provider 160) for service delivery, operations, and marketing related to transaction services provided by transaction services hub 230. For example, transaction services management system 310 may provide for customer provisioning, configuration management, reporting, troubleshooting, and/or SLA management and publishing.

Transaction services reporting system 320 may provide to customers (e.g., users associated with payment processor 130) reporting and/or administrative tools for transaction services provided by transaction network 110. In one implementation, customers may access transaction services reporting system 320 via a customer portal (e.g., a Web-based system for external users of network provider 160). For example, customer portal server 245 may provide a gateway to transaction services reporting system 320. Transaction services reporting system 320 may provide customers with a variety of reporting formats/data and may give customers the ability to manage traffic to particular hosts using, for example, a Web-based interface.

Transaction services tools system 330 may include collector applications and tools applications. The collector applications generally may receive and format data for storage. The tool applications generally may provide a variety of applications to manipulate, process, and/or control reporting of stored data. In one implementation, transaction services tools system 330 may provide interfaces to billing, provisioning, monitoring, customer notification, and enterprise support systems. Transaction services tools system 330 may also include various tools to manage and maintain the other components. In one implementation, transaction services tools system 330 may also communicate with a backend database (e.g., transaction services database 340) to format and store statistics of processed transactions.

Transaction services database 340 may store transaction information collected and/or generated by one or more of transaction services data system 300, transaction services management system 310, transaction services reporting system 320, and transaction services tools system 330. In one implementation, stored information in transaction services database 340 may be retrieved directly by one of transaction services data system 300, transaction services management system 310, transaction services reporting system 320, or transaction services tools system 330. In another implementation, transaction services tools system 330 may process data retrieval requests from the other transaction services hub 230 components. In one implementation, transaction services database 340 may include stored procedures (e.g., subprograms, such as Oracle® Stored Procedures, etc.) to manipulate data. For example, access to transaction services database 340 from transaction services tool system 330 (e.g., based on a user request via transaction services reporting system 320) may be completed using calls to stored procedures to prevent common security breaches, such as SQL injection, etc. Thus, components of transaction services hub 230 may access transaction services database 340 using calls to the stored procedures.

Although FIG. 3 shows exemplary components of transaction services hub 230, in other implementations, transaction services hub 230 may include fewer, different, differently-arranged, or additional components than depicted in FIG. 3. Alternatively, or additionally, one or more components of transaction services hub 230 may perform one or more other tasks described as being performed by one or more other components of transaction services hub 230.

Functional components of transaction services hub 230 (e.g., transaction services data system 300, transaction services management system 310, transaction services reporting system 320, transaction services tools system 330, and transaction services database 340) may be arranged in a distributed and/or redundant network configuration.

Figure 4:
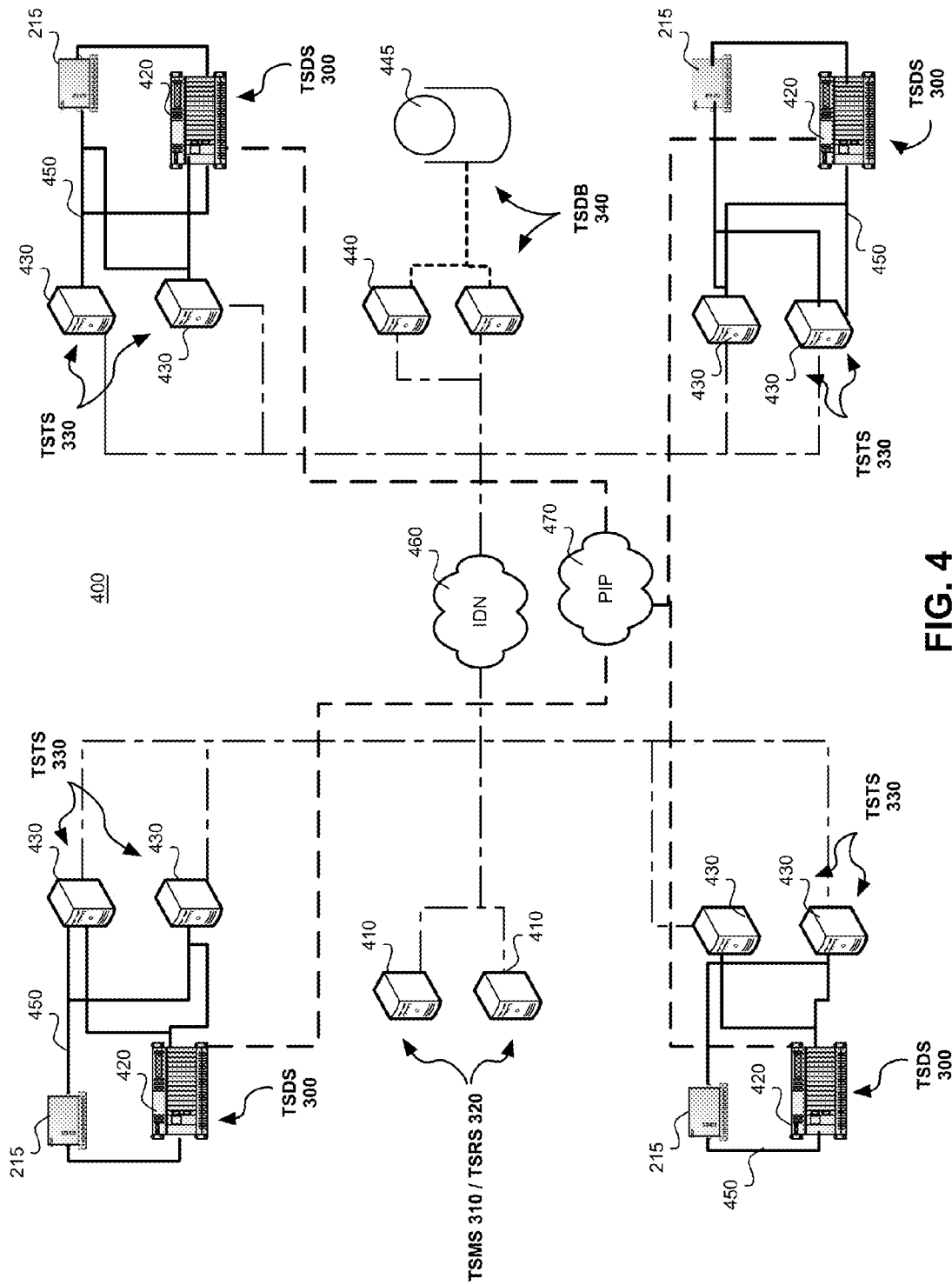
FIG. 4 is a diagram that illustrates an exemplary network arrangement for a portion of the transaction network of FIG. 1.

FIG. 4 provides an exemplary network arrangement for a portion 400 of transaction network 110 that may include a distributed configuration for transaction services hub 230. A shown in FIG. 4, network portion 400 may include web servers 410, blade servers 420, tools servers 430, and database servers 440 interconnected by one or more of a LAN connection 450, an internal data network (IDN) connection 460, or a private IP (PIP) network connection 470.

Web servers 410 may perform functions of transaction services management system 310 and/or transaction services reporting system 320. User/customer access (not shown) to web servers 410 may be restricted by network accounts and/or a type of network connectivity. Web servers 410 may communicate with tools servers 430 and/or database servers 440 via IDN connections 460.

Blade servers 420 may each execute a transaction gateway application and other applications to perform functions of transaction services data system 300. There may be multiple instances of blade servers 420 (e.g., providing a primary and a backup role) at each distributed location of transaction services hub 230. Blade servers 420 may communicate with their respective local tools servers 430 and dial access servers 215 via LAN connections 450. For example, by default, blade servers 420 may push data files to tools servers 430 that are at the same location as blade server(s) 420. In another implementation, blade servers 420 may failover and forward data files to tools servers 430 at other locations (e.g., via PIP network connections 470). Blade servers 420 may communicate with other remote blade servers 420 via PIP network connections 470.

Tools servers 430 may execute applications described herein to perform functions of transaction services tools system 330. As shown in FIG. 4, there may multiple instances of tools servers 430 (e.g., providing a primary and a backup role) at each distributed location of transaction services hub 230. Tools servers 430 may communicate locally with each other, local blade servers 420, and local dial access server 215 via LAN connections 450. Tools severs 430 may communicate with remote tools servers 430, web servers 410, and/or database servers 440 via IDN connections 460.

Database servers 440 may execute applications to perform functions of transaction services database 340. Database servers 440 may communicate with web servers 410 and/or tools servers 430 via IDN connections 460. Database servers 440 may also include local connections to one or more databases.

Although FIG. 4 shows exemplary components of network portion 400, in other implementations, network portion 400 may include fewer, different, differently-arranged, or additional components than the ones depicted in FIG. 4. Alternatively, or additionally, one or more components of network portion 400 may perform one or more other tasks described as being performed by one or more other components of network portion 400.

Figure 5:
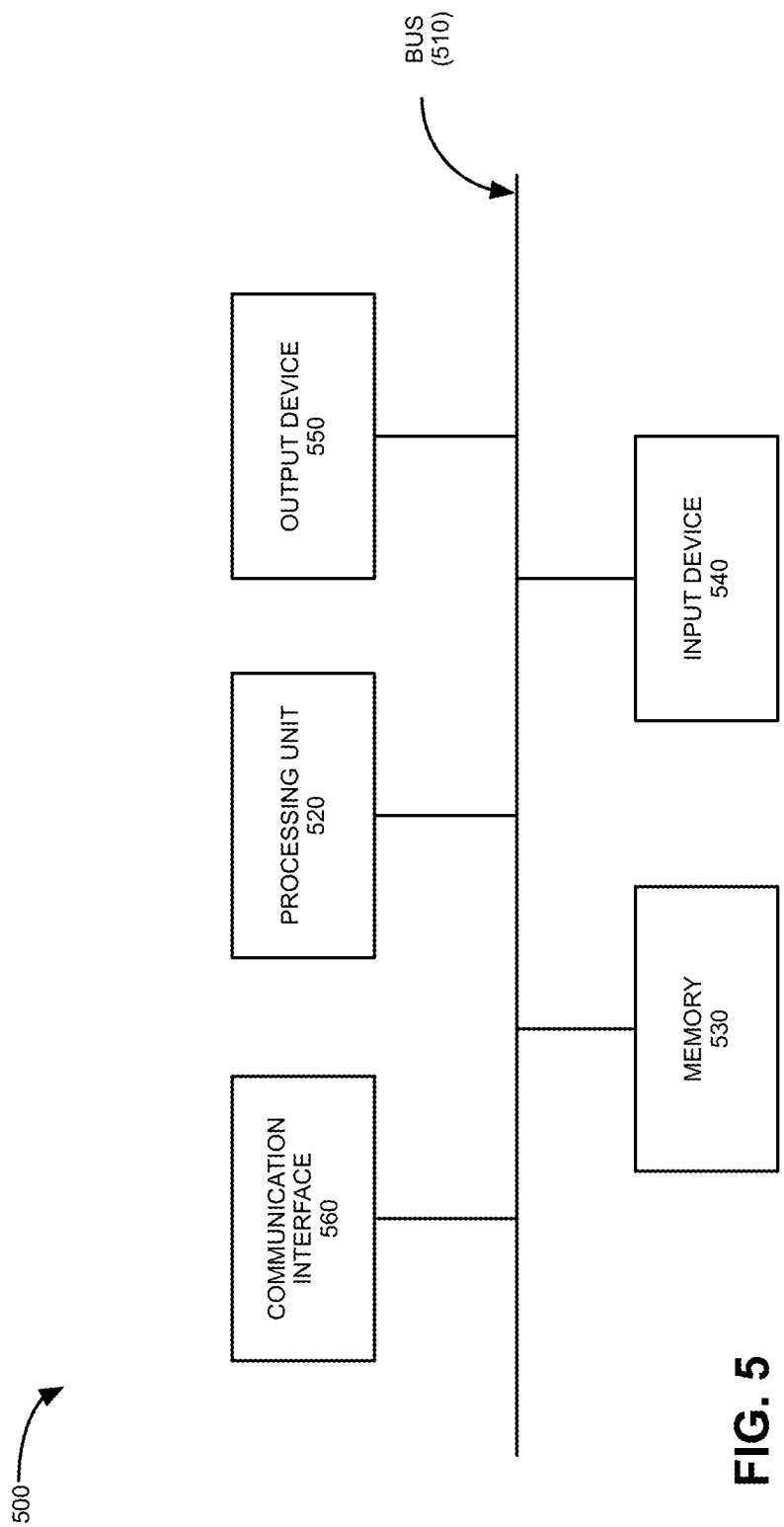
FIG. 5 is a diagram of exemplary components of a device that may be used within the network of FIGS. 1-3.

FIG. 5 is a diagram of exemplary components of a device 500. Device 500 may correspond to transaction device 120, payment processor 130, dial access server 215, gateway 220, load balancer 235, user device 240, customer portal server 245, entitlement server 250, alarm server 255, usage management server 260, notification server 265, network capacity server 270, provisioning status system 275, transaction services data system 300, transaction services management system 310, transaction services reporting system 320, transaction services tools system 330, transaction services database 340, web server 410, blade server 420, tools server 430, or database server 440. Each of transaction device 120, payment processor 130, dial access server 215, gateway 220, load balancer 235, user device 240, customer portal server 245, entitlement server 250, alarm server 255, usage management server 260, notification server 265, network capacity server 270, provisioning status system 275, transaction services data system 300, transaction services management system 310, transaction services reporting system 320, transaction services tools system 330, transaction services database 340, web server 410, blade server 420, tools server 430, and database server 440 may include one or more devices 500. As shown in FIG. 5, device 500 may include a bus 510, a processing unit 520, a memory 530, an input device 540, an output device 550, and a communication interface 560.

Bus 510 may permit communication among the components of device 500. Processing unit 520 may include one or more processors or microprocessors that interpret and execute instructions. In other implementations, processing unit 520 may be implemented as or include one or more application specific integrated circuits (ASICs), field programmable gate arrays (FPGAs), or the like.

Memory 530 may include a random access memory (RAM) or another type of dynamic storage device that stores information and instructions for execution by processing unit 520, a read only memory (ROM) or another type of static storage device that stores static information and instructions for execution by processing unit 520, and/or some other type of magnetic or optical recording medium and its corresponding drive for storing information and/or instructions.

Input device 540 may include a device that permits an operator to input information to device 500, such as a keyboard, a keypad, a mouse, a pen, a microphone, one or more biometric mechanisms, or the like. Output device 550 may include a device that outputs information to the operator, such as a display, a speaker, etc.

Communication interface 560 may include a transceiver (e.g., a transmitter and/or receiver) that enables device 500 to communicate with other devices and/or systems. For example, communication interface 560 may include mechanisms for communicating with other devices, such as other devices of network 100 or another device 500.

As described herein, device 500 may perform certain operations in response to processing unit 520 executing software instructions contained in a computer-readable medium, such as memory 530. A computer-readable medium may include a non-transitory memory device. A memory device may include space within a single physical memory device or spread across multiple physical memory devices. The software instructions may be read into memory 530 from another computer-readable medium or from another device via communication interface 560. The software instructions contained in memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows exemplary components of device 500, in other implementations, device 500 may include fewer components, different components, differently arranged components, or additional components than depicted in FIG. 5. As an example, in some implementations, input device 540 and/or output device 550 may not be implemented by device 500. In these situations, device 500 may be a "headless" device that does not explicitly include an input or an output device. Alternatively, or additionally, one or more components of device 500 may perform one or more other tasks described as being performed by one or more other components of device 500.

Figure 6:
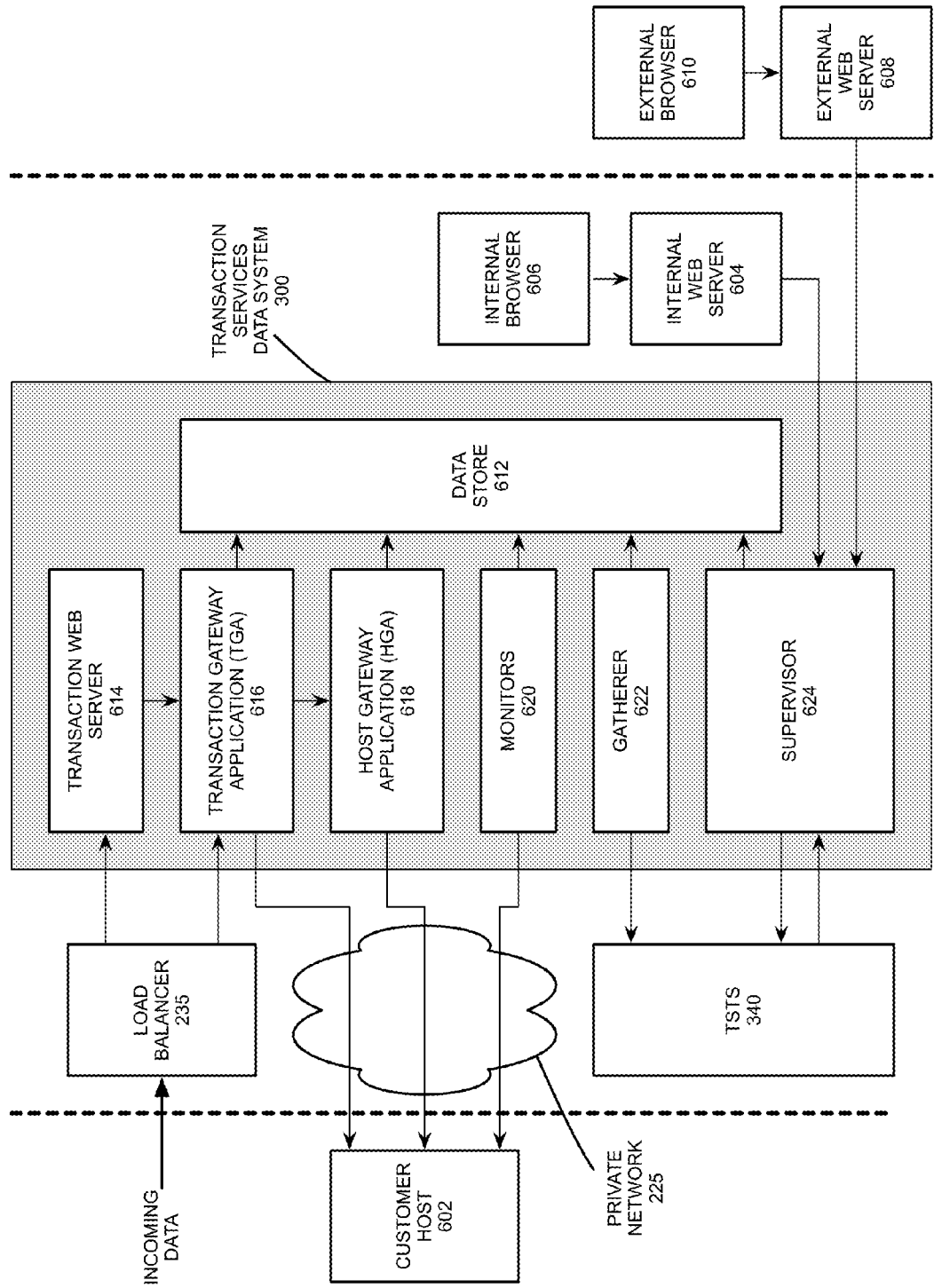
FIG. 6 is a diagram of exemplary components of the transaction services data system of FIG. 3 and a portion of network of FIG. 2.

FIG. 6 is a diagram of exemplary components of transaction services data system 300 and a portion of network 200. In FIG. 6, the portion of network 200 is depicted as including a number of devices/components of FIG. 2, customer host 602, internal web server 604, internal browser 606, external web server 608, and external web browser 610. As further shown, transaction services data system 300 includes a transaction web server 614, a transaction gateway application 616, host gateway application 618, one or more monitors 620, gatherer 622, and supervisor 624. Depending on the implementation, transaction services data system 300 may include additional, fewer, different, or differently arranged components than those illustrated in FIG. 6. For example, in some implementations, transaction services data system 300 may include one or more transaction gateway applications 616, each of which corresponds to a particular customer host 602.

Customer host 602 may include a device in payment processor 130. As described above, customer host 602 may route an authorization/transaction request from transaction services data system 300 to a particular card association 140. Upon receipt of a response, to a request for authorization, from card association 140, customer host 602 may respond to transaction services data system 300. Transaction gateway application 616 may communicate with customer host 602 via private network 225, as illustrated in FIG. 6.

Internal web server 604 includes a server for providing a web interface to internal browser 606. Internal browser 606 may allow a user inside of transaction network 110 to access, control, and configure supervisor 624 via internal web server 604. Both internal web server 604 and internal web browser 606 are within transaction network 110.

Similarly, external web server 608 includes a web server for providing a web interface to external browser 610. External browser 610 may allow a user outside of transaction network 110 to access, control, and configure supervisor 624 via external web server 608. Both external web server 608 and external web browser 610 are outside of transaction network 110.

Data store 612 may store data from transaction gateway application 616, host gateway application 618, monitors 620, gatherer 622, and supervisor 624. The data may include usage detail records, session detail records (e.g., data from transaction gateway application 616 and host gateway application 618), alarms (e.g., alarms generated by transaction gateway application 616, monitors 620, and/or supervisor 624), log files and crash dumps (e.g., files from any application from transaction services data system 300), application status reports (e.g., memory usage, disk usage, etc., written by supervisor 624 for applications that run on transaction services data system 300), etc. For example, a log file from supervisor 624 may include a name of an application running under supervisor 624's command, version of the application, a process ID of the application, a status port at which the application listens for incoming messages, uptime, application status, memory usage, CPU usage, etc.

Transaction web server 614 may accept TCP/IP connections (e.g., HTTP connections, HTTPS connections, etc.) from transaction devices 120 via load balancer 235. Over the connections, transaction web server 614 receives HTTP authorization requests and requests for transaction settlements from transaction devices 120. Upon receipt of a HTTP request/message, transaction web server 614 may remove the HTTP header from the HTTP request/message to obtain a transaction message. Transaction web server 614 may then hand off the transaction message to transaction gateway application 616. When transaction web server 614 receives a transaction response from transaction gateway application 616, transaction web server 614 may add a HTTP/HTTPS header to the transaction response to generate a HTTP/HTTPS response. Transaction web server 614 may send the HTTP/HTTPS response to transaction device 120.

Transaction gateway application 616 may receive transaction messages from transaction web server 614 and other component/devices (e.g., an secure socket layer (SSL) device (not shown) or dial access server 215), process the transaction messages, and identify and forward the processed transaction messages (or other messages resulting from the processing) to corresponding customer hosts 602. Similarly, transaction gateway application 616 may receive responses, to the transaction messages, from customer hosts 602, process the responses to obtain transaction responses, and hand off the transaction responses to transaction web server 614 or another component/device.

In processing a message from transaction web server 614, dial up server 214 or another device, transaction gateway application 616 may apply a specific transaction protocol (e.g., Visa II (Visa2)). Thereafter, transaction gateway application 616 may send the message (or another message resulting from applying the protocol to the message) over an existing session or new session (e.g., a transport protocol data unit (TPDU) session, Visa link protocol (VLP) session, EHEADER session, etc.), via host gateway application 618. Depending on the message, transaction gateway application 616 may send a message over a TPDU session, VLP session or EHEADER session without applying a transaction protocol.

Host gateway application 618 may relay, during a session, communications to/from transaction gateway application 616 from/to customer host 602. Furthermore, in relaying the communications, in some instances, host gateway application 618 may maintain persistent sockets at the both ends of the session (e.g., send keep-alive messages, from one of two sockets of a session, to the other socket). In other instances, host gateway application 618 may create new sessions to relay communications.

Monitors 620 may include a host monitor and a customer monitor. The host monitor may monitor next-hop routers in transaction network 110 (e.g., to ensure network availability), communicate with supervisor 624 to determine health statuses of applications on transaction services data system 300, and respond to health checks from load balancer 235 based on the determined health statuses. The customer monitor may monitor customer hosts (e.g., customer host 602) and applications via pings and/or periodic TCP connections. In addition, the customer monitor may notify transaction gateway application 616 when an application or a host is down. In such instances, transaction gateway application 616 may avoid routing messages to the down applications/hosts.

Gatherer 622 sends information (e.g., files) in data store 612 to transaction services tools system 340. In one implementations, gatherer 622 pushes files to two collectors at the same location (e.g., a device in which the collectors are installed). In case of a failover, gatherer 622 may forward the files to other locations.

Supervisor 624 may manage or administer applications on transaction services data system 300. When supervisor 624 starts up, supervisor 624 requests transaction services tools system 330 to download executables and configuration files. Supervisor 624 may parse the configuration files to determine which applications should be running and how each of those applications should be configured. Supervisor 624 may then start the applications in a specific sequence. Thereafter, supervisor 624 may monitor the applications, and if an application fails or becomes unresponsive, supervisor 624 may restart (or attempt to restart) the failed/unresponsive application.

Supervisor 624 may respond to different components of transaction services hub 230. For example, when transaction services tools system 330 or transaction services management system 310 queries supervisor 624 for an application status, supervisor 624 may respond to the query. In another example, supervisor 624 may act as a proxy for transaction services management system 310 or transaction services tools system 330 to communicate with other transaction services hub 230 applications.

In another example, supervisor 624 may receive a command or an instruction from transaction services tools system 330 or transaction services management system 310 and perform the requested function, such stop/start/restart a single application, stop/start/restart all applications, update an application configuration(s), etc. When transaction services tools system 340 requests supervisor 624 to update application configurations, supervisor 624 may selectively restart applications with new configuration files/data. In some instances, supervisor 624 may issue a command for a selected application to re-read an updated configuration file. In other instances, supervisor 624 may shut down applications that are no longer configured with up-to-date data.

Figure 7A:
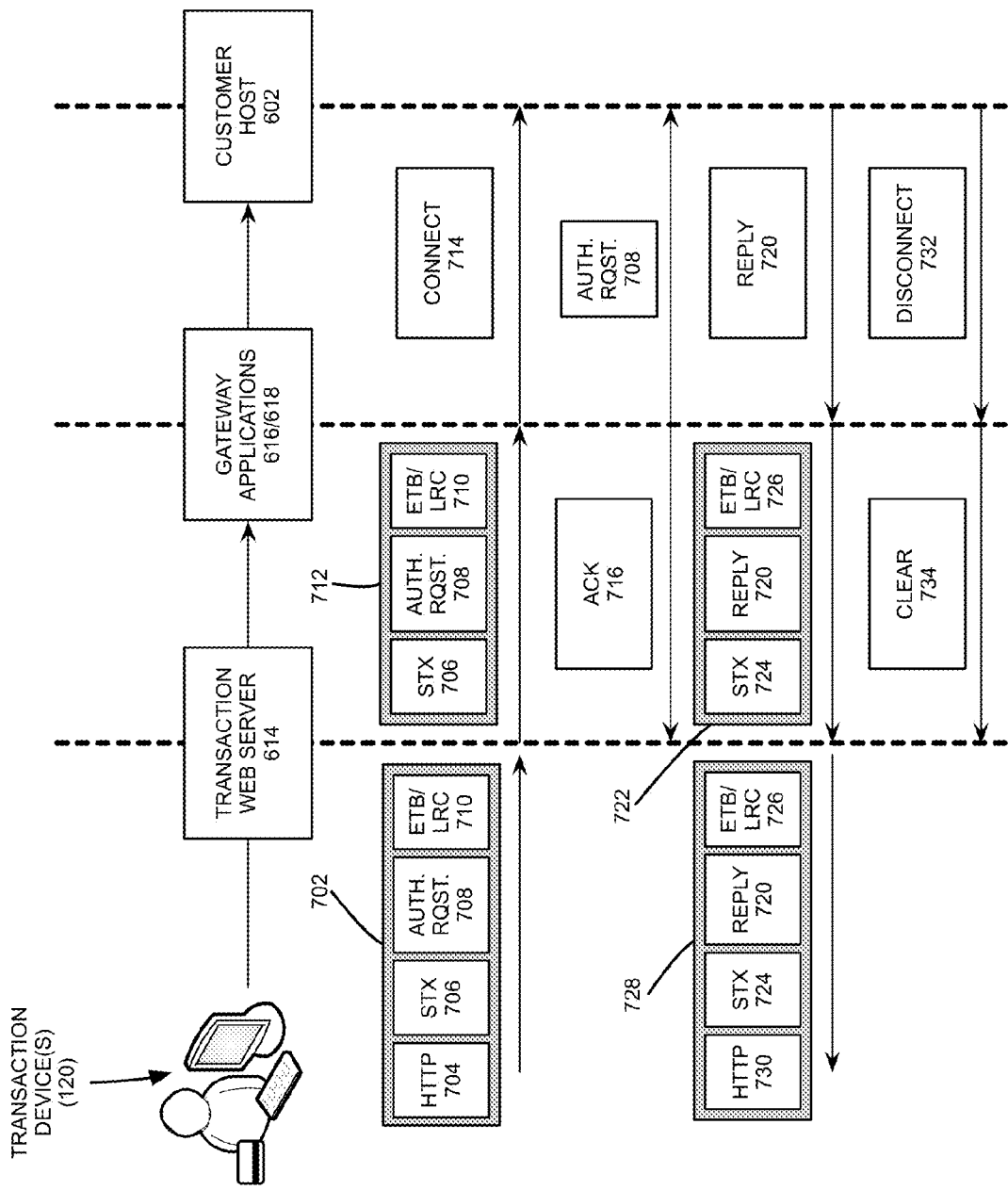
FIG. 7A and FIG. 7B are diagrams illustrating flows of messages between the transaction device of FIGS. 1 and 2, the customer host of FIG. 6, and components of the transaction services data system of FIG. 6 when the transaction device requests an authorization from the customer host.
Figure 7B:
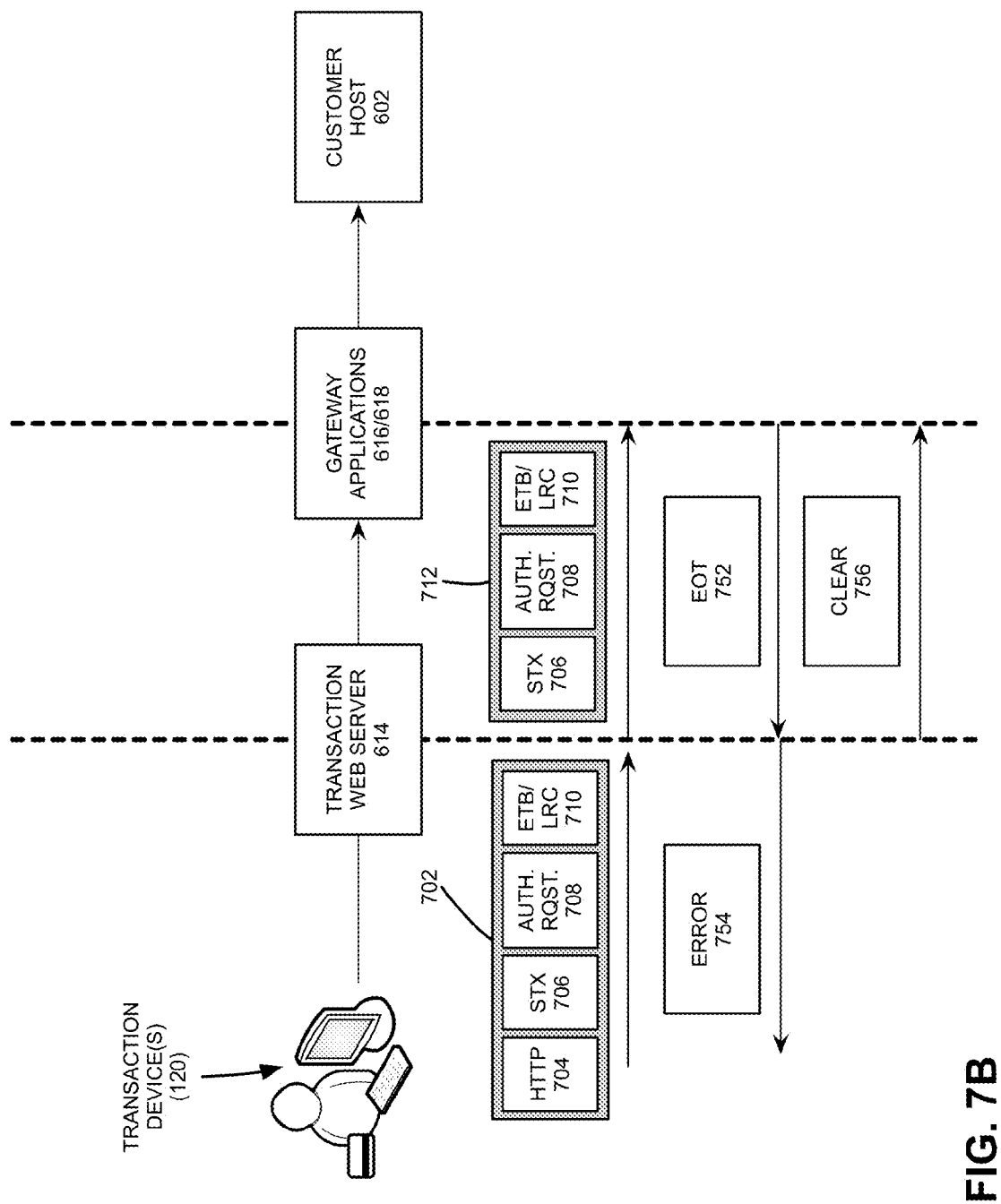
Figure 8:
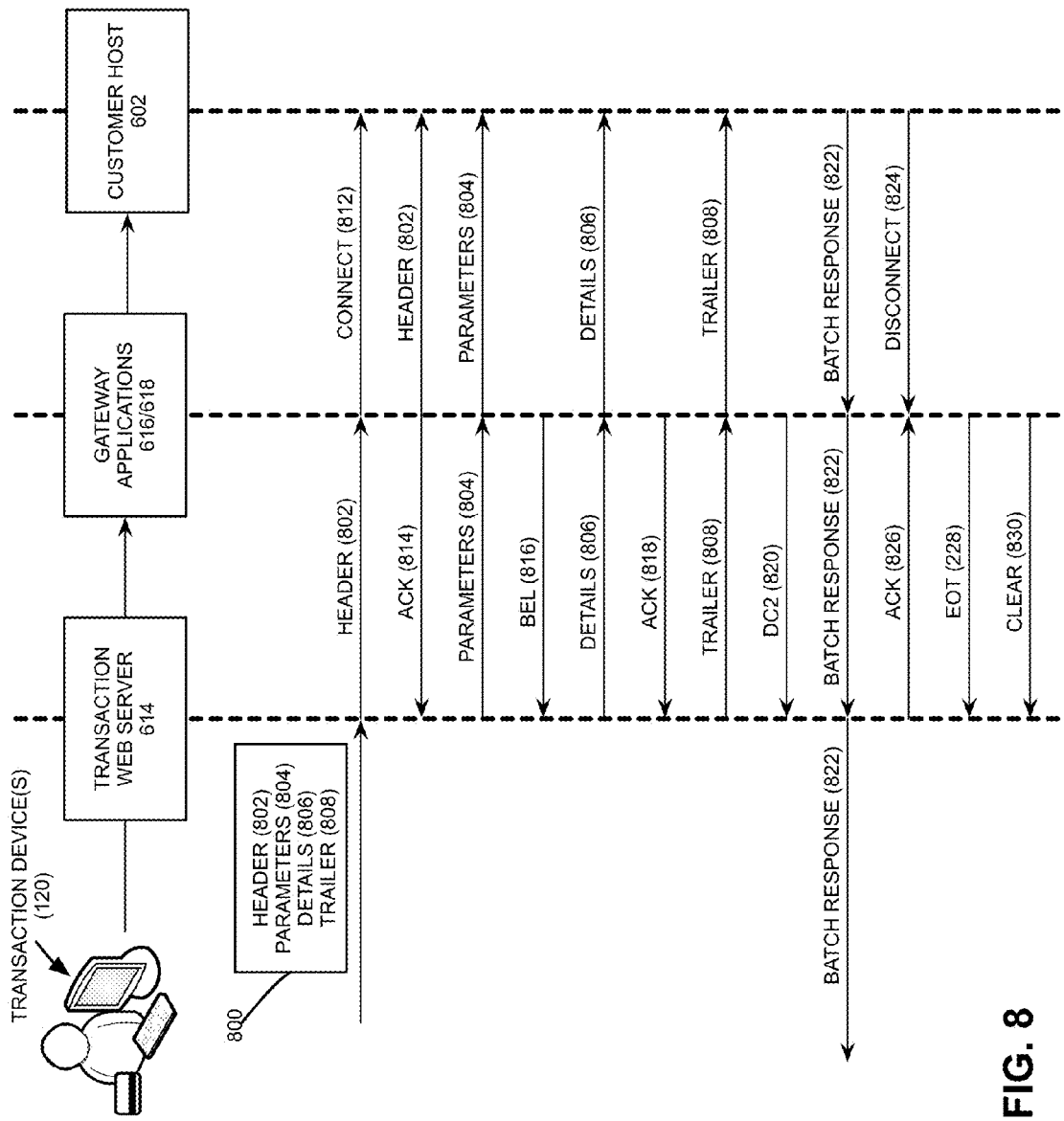
FIG. 8 is a diagram illustrating flows of messages between the transaction device of FIGS. 1 and 2, the customer host of FIG. 6, and components of the transaction services data system of FIG. 6 when the transaction device performs a settlement with the customer host.

FIGS. 7A, 7B, and 8 are diagrams illustrating exemplary flows of messages between transaction device 120, customer host 602, and components of transaction services data system 300. FIG. 7A is a diagram illustrating an exemplary flow of messages between transaction device 120, customer host 602, and components of transaction services data system 300 when transaction device 120 requests customer host 602 to authorize a transaction. As shown in FIG. 7A, transaction device 120 sends a transaction message 702 to transaction web server 614. As further shown in FIG. 7A, transaction message 702 includes a HTTP/HTTPS header 704, STX control code 706, authorization request 708, and ETB/LRC control code 710.

HTTP/HTTPS header 704 may indicate the start of a HTTP/HTTPS message and that a body of the HTTP message follows the HTTP/HTTPS header 704. STX control code 706 and ETB/LRC control codes 710 indicate the beginning of text and the end of a transmission block. Authorization request 708 may include a user identifier (ID), password, and/or other information that may be used by customer host 602 to authenticate a user and/or authorize a transaction.

As shown in FIG. 7A, upon receipt of transaction message 702, transaction web server 614 strips off HTTP/HTTPS header 704 from transaction message 702 to obtain a modified transaction message 712. Transaction web server 614 forwards modified transaction message 712 to gateway applications 616/618. Upon receipt of modified transaction message 712, gateway applications 616/618, obtain routing information based on modified transaction message 712 and establish or identify a connection 714 to customer host 602 based on the routing information. When the connection is established/identified, gateway applications 616/618 strip off control codes 706 and 710 from modified transaction message 712 to obtain an authorization request 708, send authorization request 708 to customer host 602 and send an acknowledgment (ACK) 716 to transaction web server 614.

When customer host 602 sends a reply 720 to gateway applications 616/618 over the connection, gateway applications 616/618 add control codes STX 724 and ETC/LRC 726 as a header and a trailer, respectively, to reply 720, to obtain a modified reply 722. Gateway applications 616/618 send modified reply 722 to transaction web server 614.

When transaction web server 614 receives modified reply 722, transaction web server 614 adds a HTTP/HTTPS header 730 to modified reply 722 to obtain a HTTP/HTTPS reply 728. Transaction web server 614 forwards HTTP/HTTPS reply 728 to transaction device 120. Once reply 720 (e.g., authorization or denial) has been sent to gateway applications 616/618, customer host 602 may send a disconnect request to gateway applications 616/618. In response, gateway applications 616/618 may de-allocate a socket corresponding to the connection and send a clear message 734 to transaction web server 614.

FIG. 7B is a diagram illustrating another exemplary flow of messages between transaction device 120, customer host 602, and components of transaction services data system 300 when transaction device 120 requests customer host 602 to authorize a transaction. As shown in FIG. 7B, transaction device 120 sends transaction message 702 to transaction web server 614. As in FIG. 7A, upon receipt of transaction message 702, transaction web server 614 strips off HTTP/HTTPS header 704 from transaction message 702 to obtain modified transaction message 712.

When gateway applications 616/618 receive modified transaction message 712, gateway applications 616/618 attempt to obtain routing information. However, in contrast to the example of FIG. 7A, gateway applications 616/618 are unable to obtain a valid network address for customer host 602. Accordingly, gateway applications 616/618 send an end of transmission (EOT) 752 message to transaction web server 614, which then sends an error message indicating that a customer host identifier (e.g., bank identification number (BIN)) is invalid to transaction device 120. In addition, transaction web server 614 may send a clear message 756 to gateway applications 616/618.

Although FIGS. 7A and 7B both involve a request to authorize a transaction, FIGS. 7A and 7B illustrate two different flows of messages. FIG. 7A shows a successful authorization of a transaction. In contrast, FIG. 7B shows a failure to authorize a transaction, because transaction message 702 does not include a valid identifier for customer host 602. Given an authorization request, other message flows are possible, depending on information provided in the authorization request (e.g., bad user ID, bad password, etc.).

FIG. 8 is a diagram illustrating an exemplary flow of messages between transaction device 120, customer host 602, and components of transaction services data system 300 when transaction device 120 performs a settlement with customer host 602. A settlement may occur when payments are credited/debited and/or money is transferred between accounts. In contrast to FIGS. 7A and 7B, for simplicity, FIG. 8 does not illustrate HTTP/HTTPS headers, STX headers, etc. Although not illustrated, such headers may added to or removed from messages by transaction web server 614 and/or gateway applications 616/618 as the messages travel through the components/devices in FIG. 8.

As shown, transaction device 120 sends a transaction message 800 to transaction web server 614. As further shown, transaction message 800 may include a header 802, parameters 804, details 806, and a trailer 808. Depending on the implementation, a transaction message may include additional, fewer, different, or differently arranged components than those illustrated in FIG. 8. Header 802 and trailer 808 may mark the beginning and the end, respectively, of a transaction message that requests a settlement. Parameters 804 and details 806 may include information about the transaction.

In FIG. 8, when transaction web server 614 receives transaction message 800, transaction web server 614 may partition the message into components 802-808, and may transmit them in sequence (depending on the reply from customer host 602). As shown, transaction web server 614 transmits header 802 first to gateway applications 616/618. Gateway applications 616/618 then open a connection 812 to customer host 602. If connection 812 is successfully opened, gateway applications 616/618 send an acknowledgment (ACK) 814 to transaction web server 614 and send header 802 to customer host 602.

When transaction web server 614 receives ACK 814, transaction web server 614 sends parameters 804 to gateway applications 616/618, which send a bell (BEL) response 816 to transaction web server 614 and forward parameters 804 to customer host 602. BEL response 816 may indicate that gateway applications 616/618 have forwarded parameters 804 to customer host 602.

Upon receipt of BEL response 816, transaction web server 614 sends details 806 to gateway applications 616/618. In response, gateway applications 616/618 forward details 806 to customer host 602 and send an acknowledgment (ACK) 818 to transaction web server 614. ACK 818 may indicate that gateway applications 616/618 have forwarded details 806 to customer host 602.

Upon receipt of ACK 818, transaction web server 614 sends trailer 808 to gateway applications 616/618. In response, gateway applications 616/618 forward trailer 808 to customer host 602 and send a device control 2 (DC2) response 820. DC2 response 820 may indicate that gateway applications 616/618 have forwarded trailer 808 to customer host 602, and that transaction device 120 is wait for a response from customer host 602.

When customer host 602 receives trailer 808, customer host 602 performs functions that are necessary to settle or complete the transaction. If the transaction is successfully settled, customer host 602 sends a batch response 822 to gateway applications 616/618. In addition, customer host 602 performs a disconnect 824 from gateway applications 616/618. Batch response 822 travels through gateway applications 616/618 and transaction web server 614 to transaction device 120. Along the way, when batch response 822 reaches transaction web server 614, transaction web server 614 sends an acknowledgment 826 to gateway applications 616/618. To conclude the transaction, gateway applications 616/618 sends end-of-transmission (EOT) message 828 and clear message 830 to transaction web server 614.

In FIGS. 7A, 7B, and 8, gateway applications 616/618 are illustrated as receiving message 702 and message 800 from transaction device 120 through transaction web server 614. Depending on transaction device 120, messages from transaction device 120 may be routed to, gateway applications 616/618 components/devices other than transaction web server 614, such as dial access server 215, an SSL server/device, etc.

Figure 9:
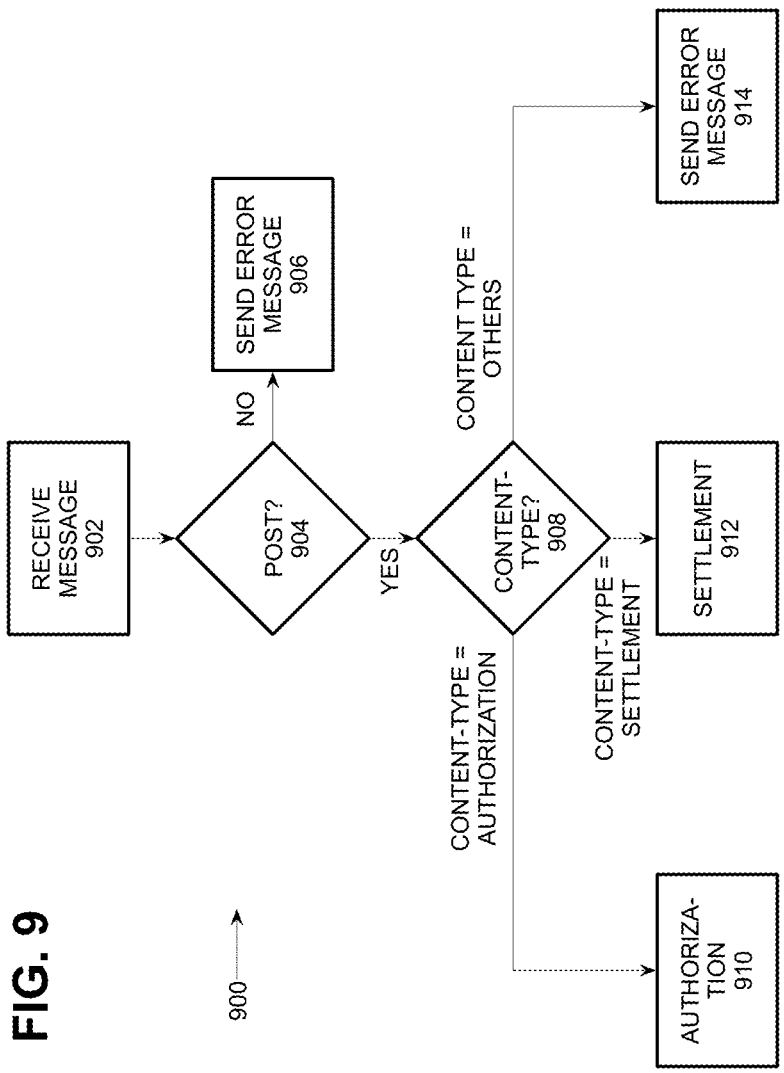
FIG. 9 is a flow diagram of an exemplary overall process for handling a message, from the transaction device of FIG. 1, at the transaction web server of FIG. 6.

FIG. 9 through FIG. 14 are flow diagrams of exemplary processes that are associated with transaction web server 614 and flow of messages, illustrated in FIGS. 7A, 7B, and 8. FIG. 9 is a flow diagram of an exemplary overall process 900 for handling a message from transaction device 120, by transaction web server 614.

As shown in FIG. 9, transaction web server 614 may receive a message from transaction device 120 (block 902). In some implementations, the message may be a HTTP message. In these implementations, other devices/components of transaction network 110 (e.g., load balancer 215) may have handled processes that are associated with security. In other implementations, the message may be a HTTPS message.

Transaction web server 614 may determine whether the message is a POST message (e.g., by examining the header of the message) (block 904). If the message is not a POST message (block 904: no), transaction web server 614 may send an error message to transaction device 120 (block 906). Otherwise (block 904: yes), transaction web server 614 may determine the content type of the message (block 908). If the content type is authorization (block 908: authorization), transaction web server 614 may perform an exemplary process 1000 illustrated in FIG. 10 (block 910). If the content type is a settlement (block 908: settlement), transaction web server 614 may perform an exemplary process 1100 illustrated in FIG. 11. Processes 1100 and 1200 are described below with reference to FIG. 10 and FIG. 11, respectively. If the content type is neither the authorization nor the settlement (block 908: others), transaction web server 614 may send an error message to transaction device 120 (block 914).

Figure 10:
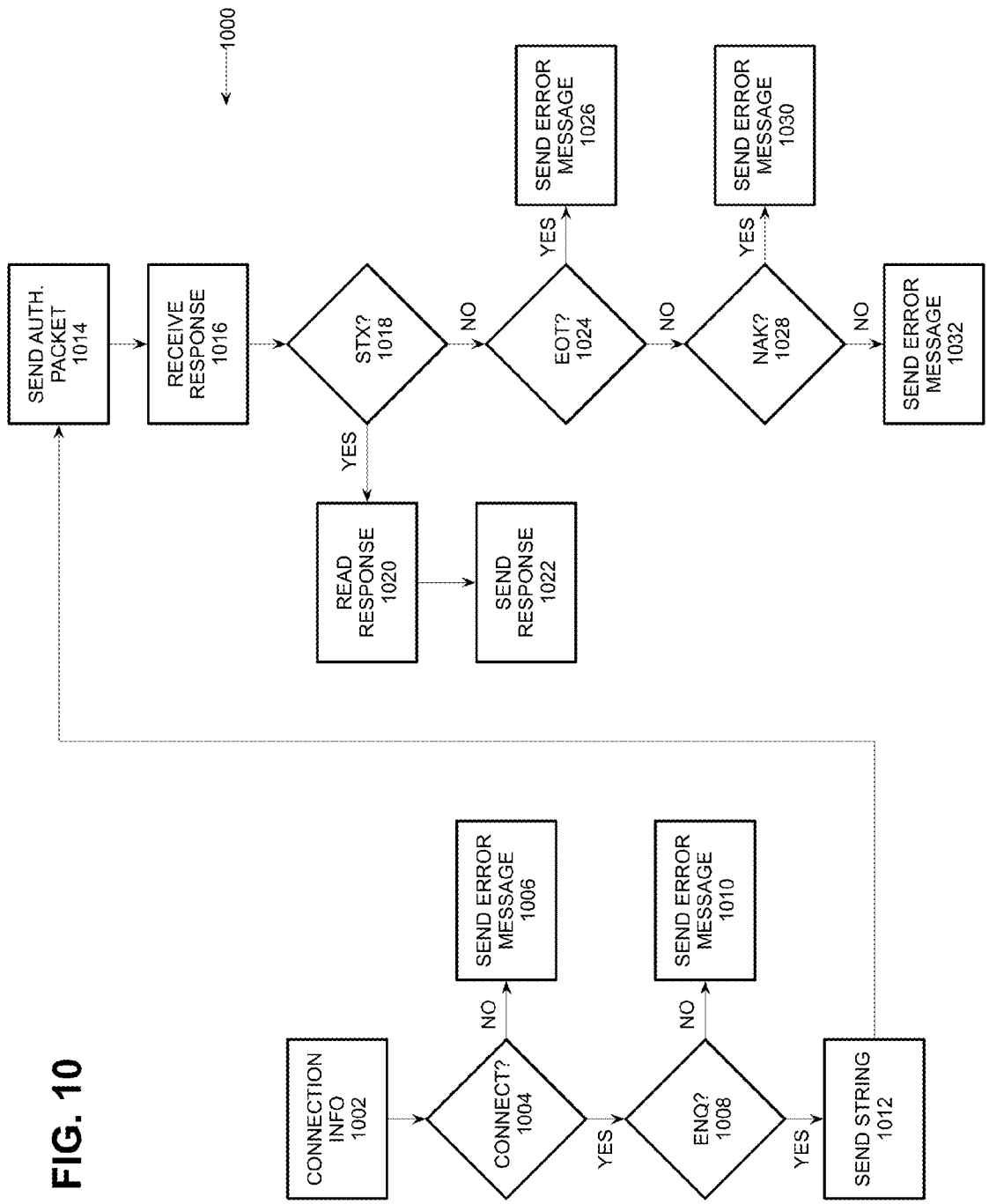
FIG. 10 is a flow diagram of an exemplary process that is associated with the authorization block of FIG. 9.

FIG. 10 is a flow diagram of exemplary process 1000 that is associated with authorization block 910. Process 1000 is for obtaining an authentication/authorization that is associated with a transaction. As shown, process 1000 may include transaction web server 614 obtaining and generating connection information (block 1002). The connection information may include information about transaction device 120. Depending on the implementation and configuration of transaction services hub 230, the transaction gateway application 616 may or may not reside on the same blade server 420 on which transaction web server 614 resides.

Transaction web server 614 may then attempt to connect to transaction gateway application 616 based on the connection information (block 1004). If transaction web server 614 is not able to connect to transaction gateway application 616 (block 1004: no), transaction web server 614 may send an error message to transaction device 120 (block 1006). Otherwise (block 1004: yes), transaction web server 614 may receive from transaction gateway application 616 an enquiry (ENQ) message (block 1008). An ENQ message is a query that requests a device or a component whether the device/component is ready to provide service (e.g., an authorization service). If the message does not include an ENQ message (block 1008: no), transaction web server 614 may transmit an error message to transaction device 120 (block 1010).

If the message includes an ENQ message (block 1008: yes), transaction web server 614 may obtain the connection information 1102 and send a string representing the connection information to transaction gateway application 616 (block 1012). The string may include information about transaction device 120.

In addition to the string, the message may include additional data, herein referred to as an authorization packet. The authorization packet may include, for example, user ID, password, etc. Transaction web server 614 may send the authorization packet (block 1014).

Transaction web server 614 may receive a response from transaction gateway application 616 (block 1016). If a header of the response indicates the start of text (STX) (block 1018: yes), transaction web server 614 may read the remainder of the response (block 1020). A process for reading the remainder of the response is described below with reference to FIG. 13. After reading the remainder of the response, transaction web server 614 may encapsulate the response as a HTTP response, and forward the HTTP response to transaction device 120 (block 1022).

Returning to block 1018, if the header of the response does not indicate the STX (block 1018: no), transaction web server 614 may determine whether the header indicates an end-of-transmission (EOT) (block 1024). If the header indicates the EOT (block 1024: yes), transaction web server 614 may send, to transaction device 120, an error message that indicates the connection to transaction gateway application 616 was disconnected prematurely (e.g., due to a bad BIN) (block 1026).

If the header of the response does not indicate the EOT (block 1024: no), transaction web server 614 may determine whether the header indicates a negative acknowledgment (NAK) (block 1028). If the header indicates the NAK (block 1028: yes), transaction web server 614 may send, to transaction device 120, an error message that indicates the authorization packet, which is sent at block 1014, is improperly formatted (block 1030). If the header does not indicate the NAK (block 1028: no), transaction web server 614 may send, to transaction device 120, an error message that indicates the response from transaction gateway application 616 is an unexpected response (e.g., a response that is not expected from Visa II protocol handling (e.g., header is not EOT, NAK, etc.).

Figure 11:
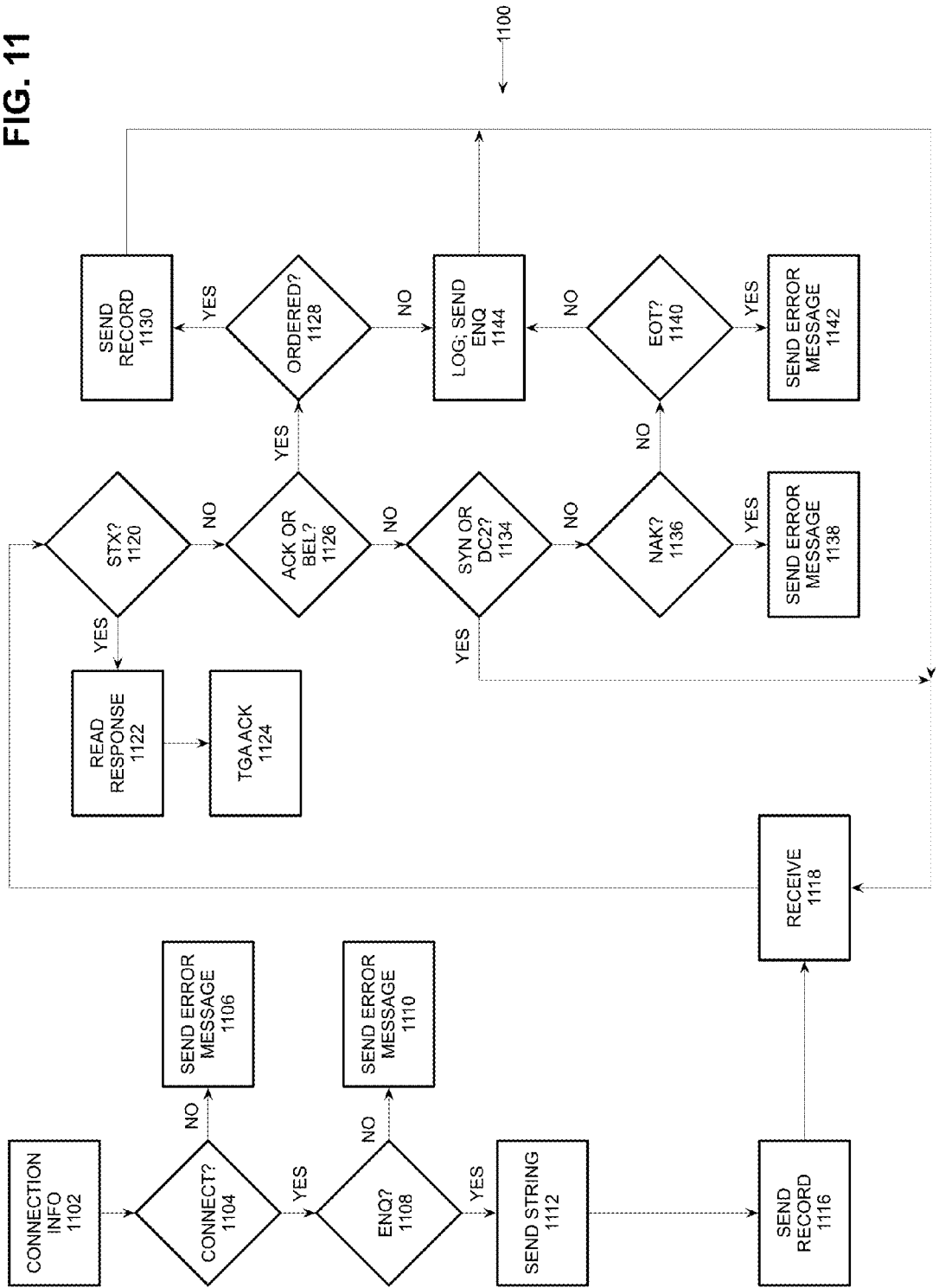
FIG. 11 is a flow diagram of an exemplary process that is associated with the settlement block of FIG. 9.

FIG. 11 is a flow diagram of an exemplary process 1100 that is associated with settlement block 912. Process 1100 is for settling a transaction. Process 1100 may include transaction web server 614 obtaining connection information (block 1102). As described above with reference to FIG. 10, the connection information may include information about the transaction device 120.

Transaction web server 614 may attempt to connect to transaction gateway application 616 based on the connection information (block 1104). If transaction web server 614 is unable to connect to transaction gateway application (block 1104: no), transaction web application 614 may send an error message to transaction device 120 (block 1106). Otherwise (block 1104: yes), transaction web server 614 may receive a message (block 1108). If the message does not include an ENQ (block 1108: no), transaction web server 614 may transmit an error message to transaction device 120 (block 1110).

If the message includes an ENQ (block 1108: yes), transaction web server 614 may obtain connection information and send a string representing the connection information to transaction gateway applications 616 (block 1112). The string may include information for transaction gateway application 616 to connect to customer host 602. The string may include, for example, a BIN.

In addition to the string, the message may include additional information/data, herein referred to as settlement records (e.g., header 802, parameters 804, details 806, trailer 808, etc.). The settlement records may include, for example, an amount to be credited/debited to a user account. Transaction web server 614 may send the header of the settlement record to transaction gateway application 616 (block 1116), which in turn may send the header to customer host 602. The header may indicate to customer host 602 that settlement information for a transaction is to follow. A process for sending the settlement record is described below with reference to FIG. 12.

Transaction web server 614 may receive a response from customer host 602, via transaction gateway application 616 (block 1118). Upon receipt of the response, transaction web server 614 may read a first byte of the header of the response. If the first byte of the header indicate an STX (block 1120: yes), transaction web server 614 may read the remainder of the response from customer host 602 (block 1122). A process for reading the remainder of the response is described below with reference to FIG. 13. After reading the remainder of the response, transaction web server 614 may perform TGA ACK block 1124. A process for performing TGA ACK block 1124 is described below with reference to FIG. 14.

If the first byte of the header is not the STX (block 1120: no), transaction web server 614 may determine whether the first byte indicates an ACK or a BEL (an alarm) (block 1126). If the first byte indicates an ACK or BEL (block 1126: yes), transaction web server 614 may determine whether the ACK is BEL being received in the correct order (block 1128). For example, in FIG. 8, given a settlement, transaction web server 614 receives an ACK, BEL, and ACK in sequence.

If the ACK or BEL is correctly ordered for the transaction (block 1128: yes), transaction web server 614 may send the next settlement record in the message received from transaction device 120 (block 1130). A process for sending the settlement record is described below with reference to FIG. 12. Thereafter, transaction web server 614 may proceed to block 1118 to receive a reply from transaction gateway application 614. If the ACK/BEL is not in the correct order (block 1128: no), transaction web server 614 may log an error, and send an ENQ message to transaction gateway application 614 (block 1144). Furthermore, transaction web server 614 may proceed to block 1118.

Returning to block 1126, if the first byte of the header of the response is not an ACK or a BEL (block 1126: no), transaction web server 614 may determine whether the first byte indicates a synchronous idle (SYN) response or a device control 2 (DC2) response (block 1134). If the first byte indicates a SYN/DC2 response (block 1134: yes), transaction web server 614 may proceed to 1118. Otherwise (block 1134: no), transaction web server 614 may determine whether the response is a NAK (block 1136). If the response is a NAK (block 1136: yes), transaction web server 614 may send an error message to transaction device 120 (block 1138). The error message may indicate the number of transaction records sent to customer host 602 before customer host 602 rejected the settlement. If the response is not a NAK (block 1136: no), transaction web server 614 may determine whether the response is an end-of-transmission (EOT) response (block 1140).

If the response is an EOT (block 1140: yes), transaction web server 614 may send an error message to transaction device 120, to indicate that transaction gateway application 616 prematurely closed the connection to transaction web server 614 (block 1142). If the response is not an EOT (block 1140: no), transaction web server 614 may go to block 1144, to log an error and send an ENQ message to transaction gateway application 616.

Figure 12:
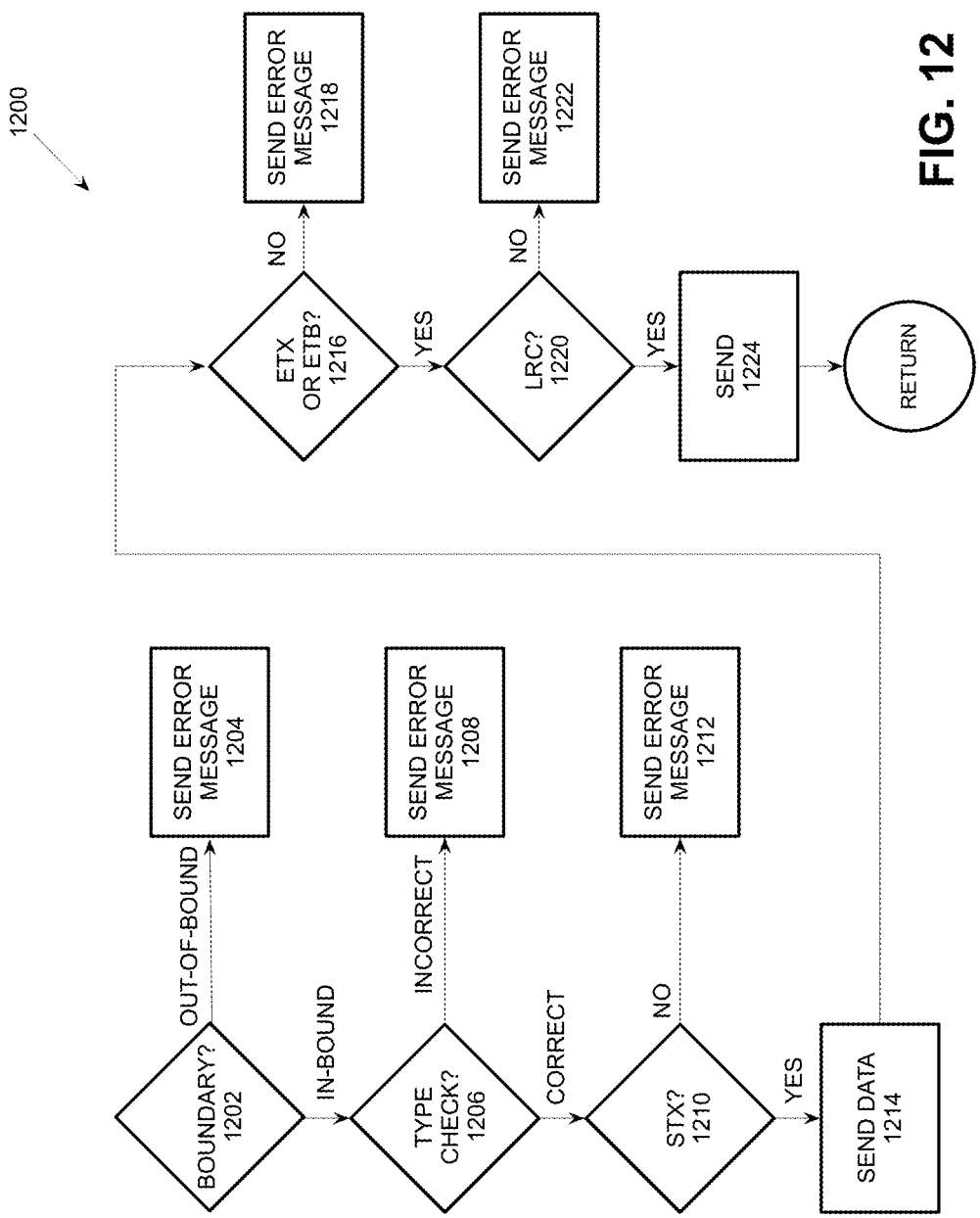
FIG. 12 is a flow diagram of an exemplary process for the send settlement record blocks of FIG. 11.

FIG. 12 is a flow diagram of an exemplary process 1200 for sending a settlement record at block 1116 and block 1130 in process 1100. As shown, process 1200 may include transaction web server 614 determining whether transaction web server 614 has prematurely detected a boundary for settlement records (e.g., an end of the record marker) (block 1202). If transaction web server 614 has detected the boundary (block 1202: out-of-bound), transaction web server 614 may send an error message to transaction device 120 (block 1204). The error message may indicate that transaction web server 614 has detected the end of settlement records (e.g., the end of a settlement batch) before receiving a response from customer host 602. If transaction web server does not detect the boundary (block 1202: in-bound), transaction web server 614 may perform a type check on the settlement record to be sent to customer host 602 (block 1206). In some implementation, in performing the type check, transaction web server 614 may determine whether a specific field in the settlement record indicates the type of application that is to receive and handle the record.

If the type check fails (block 1206: incorrect) (e.g., a record does not match the application type), transaction web server 614 may send an error message to transaction device 120 (block 1208). If the type check succeeds (block 1206: correct), transaction web server 614 may check the first byte of the settlement record (block 1210). If the first byte of the settlement record does not indicate an STX (block 1210: no), transaction web server 614 may send an error message to transaction device 120 (block 1212). The error message may indicate that the settlement does not begin with an STX.

If the first byte indicates the STX (block 1210: yes), transaction web server 614 may send the data in the settlement record (block 1214). Transaction web server 614 may continue to send data until an end-of-text (ETX) or an end-of-block (ETB) markers is detected by transaction web server 614. If transaction web server 614 does not detect an ETX or an ETB (block 1216: no), transaction web server 614 may send an error message to transaction device 120 (block 1208). The error message may signify that the settlement record is badly framed/or incorrectly formatted.

If the record includes an ETX or ETB (block 1216: yes), transaction web server 614 may determine whether the record includes an longitudinal redundancy check (LRC) byte (block 1220). If transaction web server 614 does not detect the LRC (block 1220: no), transaction web server 614 may send an error message to transaction device 120 (block 1222), to convey that no LRC was found in the settlement record. If transaction web server 614 detects the LRC (block 1220: yes), transaction web server 614 may send the LRC to customer host 602 (block 1224). Thereafter, transaction web server 614 may return to the point in process 1100 from which transaction web server 614 entered process 1200.

Figure 13:
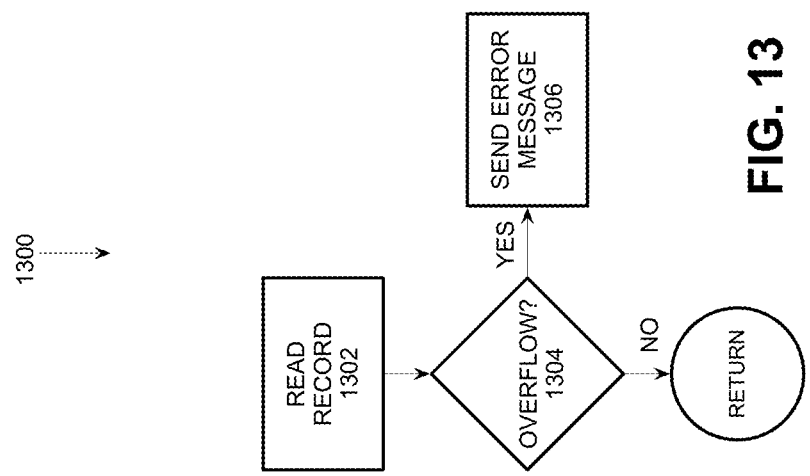
FIG. 13 is a flow diagram of an exemplary process that is associated with the read response blocks of FIG. 9 and FIG. 10.

FIG. 13 is a flow diagram of an exemplary process that is associated with read response block 1020 in process 1000 or read response block 1122 in process 1100. As shown, process 1300 may include reading a record of the format <STX>data<ETX><LRC> (block 1302). Furthermore, transaction web server 614 may determine whether reading the record results in a buffer reserved for reading the record. If transaction web server 614 detects an overflow in the read buffer (block 1304: yes), transaction web server 614 may send an error message (block 1306). The error message may indicate that the host response is too large. If transaction server device 614 does not detect an overflow, transaction server device 614 may return to the point, in process 1000 or 1100, from which transaction web server 614 entered process 1300.

Figure 14:
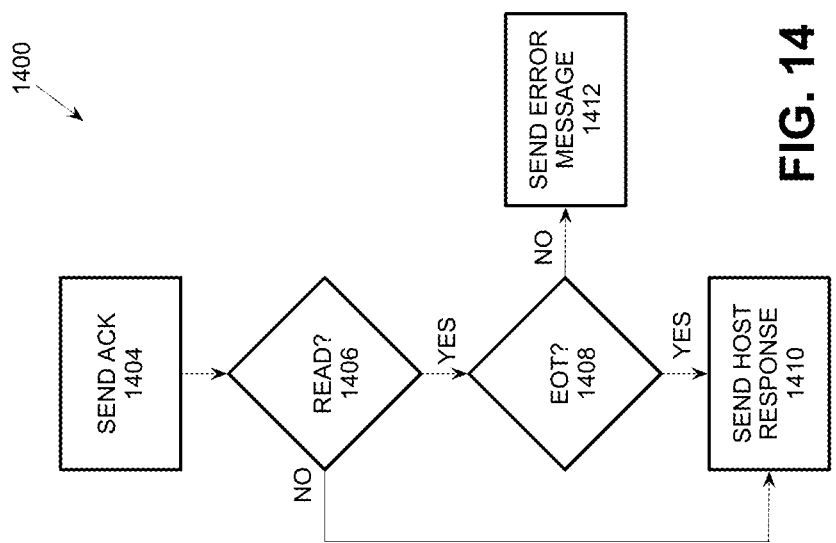
FIG. 14 is a flow diagram of an exemplary process that is associated with the TGA ACK block of FIG. 11.

FIG. 14 is a flow diagram of an exemplary process 1400 that is associated with TGA ACK block 1124 in process 1100. As shown, process 1400 may include transaction web server 614 sending an ACK to transaction gateway application 616 (block 1404). Thereafter, transaction web server 614 may wait to receive a response from transaction gateway application 616. If transaction web server 614 does not receive the response (that is, transaction web server 614 is unable to read a first byte of the response) (block 1406: no), transaction web server 614 may send the host response received at block 1118 of process 1100 to transaction device 120 (block 1410).

If transaction web server 614 receives the response and, therefore, is able to read the first byte of the response (lock 1406: yes), transaction web server 614 may determine whether the first byte of the response indicates an EOT (block 1408). If the first byte indicates an EOT (block 1408: yes), transaction web server 614 may proceed to block 1410. Otherwise (block 1408: no), transaction web server 614 may send an error message to transaction device 120 (block 1412). The error message may indicate that transaction web server 614 has received an unexpected response from transaction gateway application 616.

Figure 15:
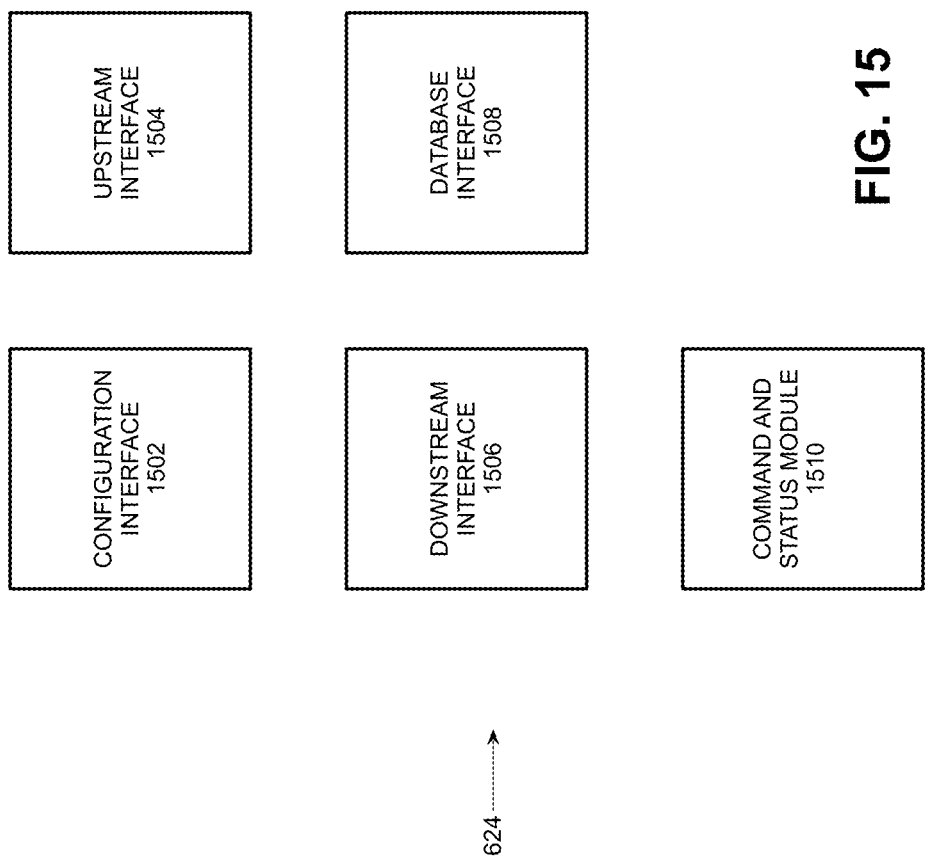
FIG. 15 is a block diagram of exemplary functional components of the supervisor of FIG. 6.

FIG. 15 is a block diagram of exemplary functional components of supervisor 624. As shown, supervisor 624 may include a configuration interface 1502, an upstream interface 1504, a downstream interface 1506, a database interface 1508, and a command and status module 1510. Depending on the implementation, supervisor 624 may include additional, fewer, different, or differently arranged components than those illustrated in FIG. 15.

Configuration interface 1502 includes a supervisor configuration interface and an application configuration interface. The supervisor configuration interface includes an interface for reading a supervisor configuration file during supervisor 624 startup. The file may include authentication/authorization information (e.g., the location of a private key files, user ID, etc.) and configuration information. Supervisor 624 may restart after the configuration file has been modified, or alternatively, after supervisor 624 has been updated (e.g., a different version). The application configuration interface includes an interface for performing a database lookup of an application (e.g., names, versions, and paths of an executable for the application, as well as information about a configuration file of the application) in a configuration database and invoking a command for reconfiguring the application. In some instances, reconfiguring an application may include restarting the application with an updated configuration file.

Upstream interface 1504 may include an interface for notifying upstream devices (e.g., routers, load balancers, etc.) of supervisor 624's status and/or another application's status. Upstream interface 1504 may indicate, for example, in response to a load balancer 215's health check (HC) command/request that at least one transaction gateway application 616 is running In another example, upstream interface 1504 may obtain new configuration files for transaction services tools system 330 and perform operations on behalf of transaction services tools system 330.

Downstream interface 1506 may include an inter-process-communication (IPC) mechanism between supervisor 624 and applications to which supervisor 624 is a parent (e.g., applications that are spawned by supervisor 624). Depending on the implementation, the downstream interface 1506 may include named pipes, shared memory, message queues, socket based IPC's, streams, etc. Via downstream interface 1506, supervisor 624 may send a command, a health check request, etc.

Database interface 1508 may include an interface to access databases. The databases may include a configuration database (e.g., SQL or SQL Lite, etc.) for applications. In one implementation, an SQL query (via the interface) about an application may provide supervisor 624 with the following information: name of a file (e.g, executable, configuration file, etc.), file type, version, a command-line options to pass to an application startup or stop, a TCP port at which the application listens for commands, the name of a command for invoking a health check, etc.

Command and status module 1510 may include interfaces for receiving user commands at supervisor 624 and for issuing commands to applications controlled by supervisor 624. In addition, command and status module 1510 may include interfaces for displaying statuses of supervisor 624. Command and status module 1510 may also include interfaces for receiving statuses of applications (as a result of supervisor 624 issuing a command to the application), and to output the statuses to a user, to a file, to a database, to a reporting application (e.g., an application which notifies an operator or a user), etc.

In exchanging commands/statuses with a client, supervisor 624 may use Secure Socket Layer (SSL). In exchanging commands/statuses with applications controlled by supervisor 624, supervisor 624 may employ extensible markup language (XML)-remote procedure calls (RPCS).

Figure 16:
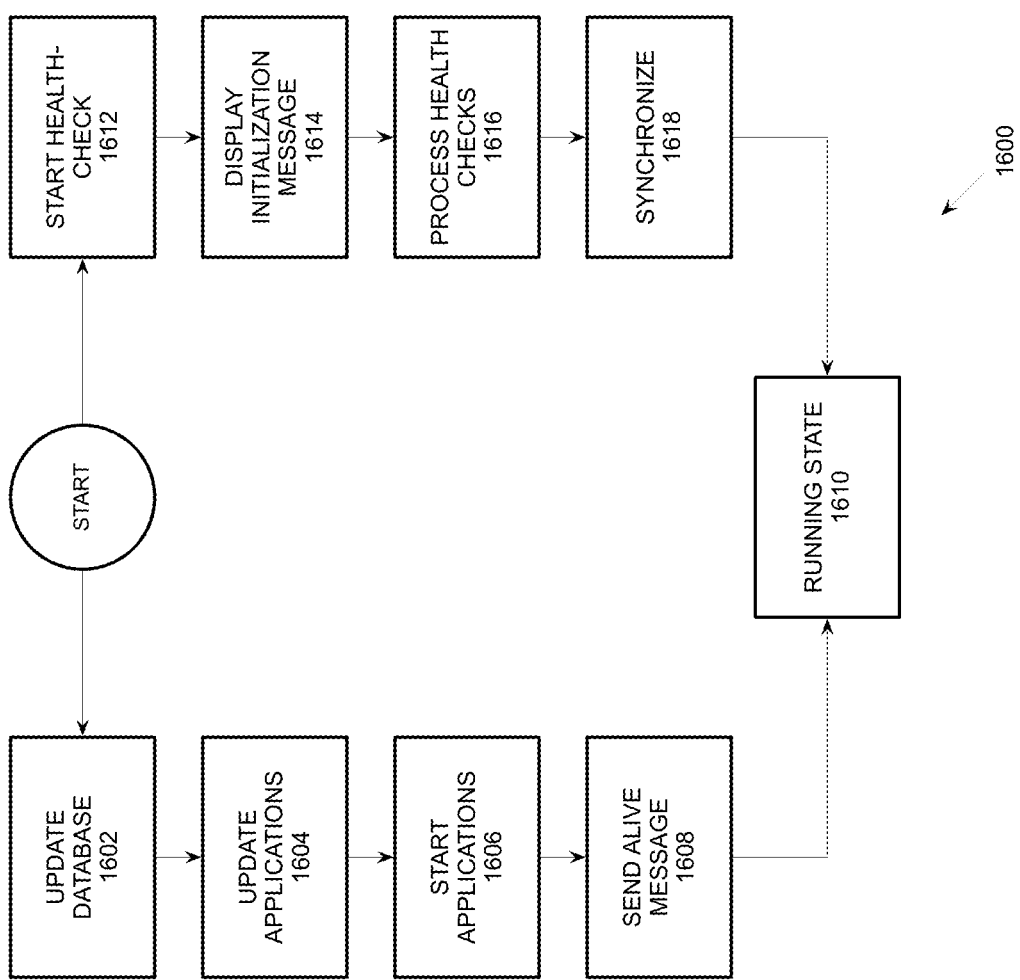
FIG. 16 is a block diagram of an exemplary process that is associated with the supervisor of FIG. 6.

FIG. 16 is a block diagram of an exemplary process 1600 that is associated with supervisor 624. Process 1600 may include one or more threads/processes. For example, in one implementation, process 1600 may include two threads, one thread including blocks 1602-1608 and the other threads including blocks 1612 through 1618.

The thread including blocks 1602-1608 may begin by updating configuration files/databases (block 1602) and updating applications (block 1604). In some implementations, updating the configuration files and applications may include copying one directory to another (e.g., a directory associated with transaction services tools system 330).

After the applications are updated, supervisor 624 may start the updated applications (block 1606). A process for starting the applications is described below with reference to FIG. 17. Furthermore, supervisor 624 may send alive messages (for each application) to other system components that need to be aware whether supervisor 624 and supervised applications are up or down (block 1608). Thereafter, supervisor 624 may enter a running state (block 1610). A process associated with running state block 1608 is described below with reference to FIG. 18.

The thread associated with blocks 1612-1618 may include starting health checks (block 1612). Supervisor 624 may issue health check messages to the supervised applications and/or other components of transaction services data system 300. Supervisor 624 may display or send a message that is associated with a startup or an initialization of supervisor 624 or other applications, to other systems, devices, or components in transaction services hub 230 (block 1614).

Supervisor 624 may process health check messages and replies to health check queries (block 1616). For example, if supervisor 624 sends a health check message to a transaction gateway application 616 and transaction gateway application 616 responds with an ACK, supervisor 624 may log the health check and the reply.

Supervisor 624 may synchronize itself and/or the spawned applications (block 1618) (e.g., synchronize its clock with a network-wide clock in transaction services hub 230 via network time protocol (NTP). Thereafter, supervisor 624 may proceed to 1610, to enter the running state (block 1610). A process associated with the running state is described below with reference to FIG. 18.

Figure 17:
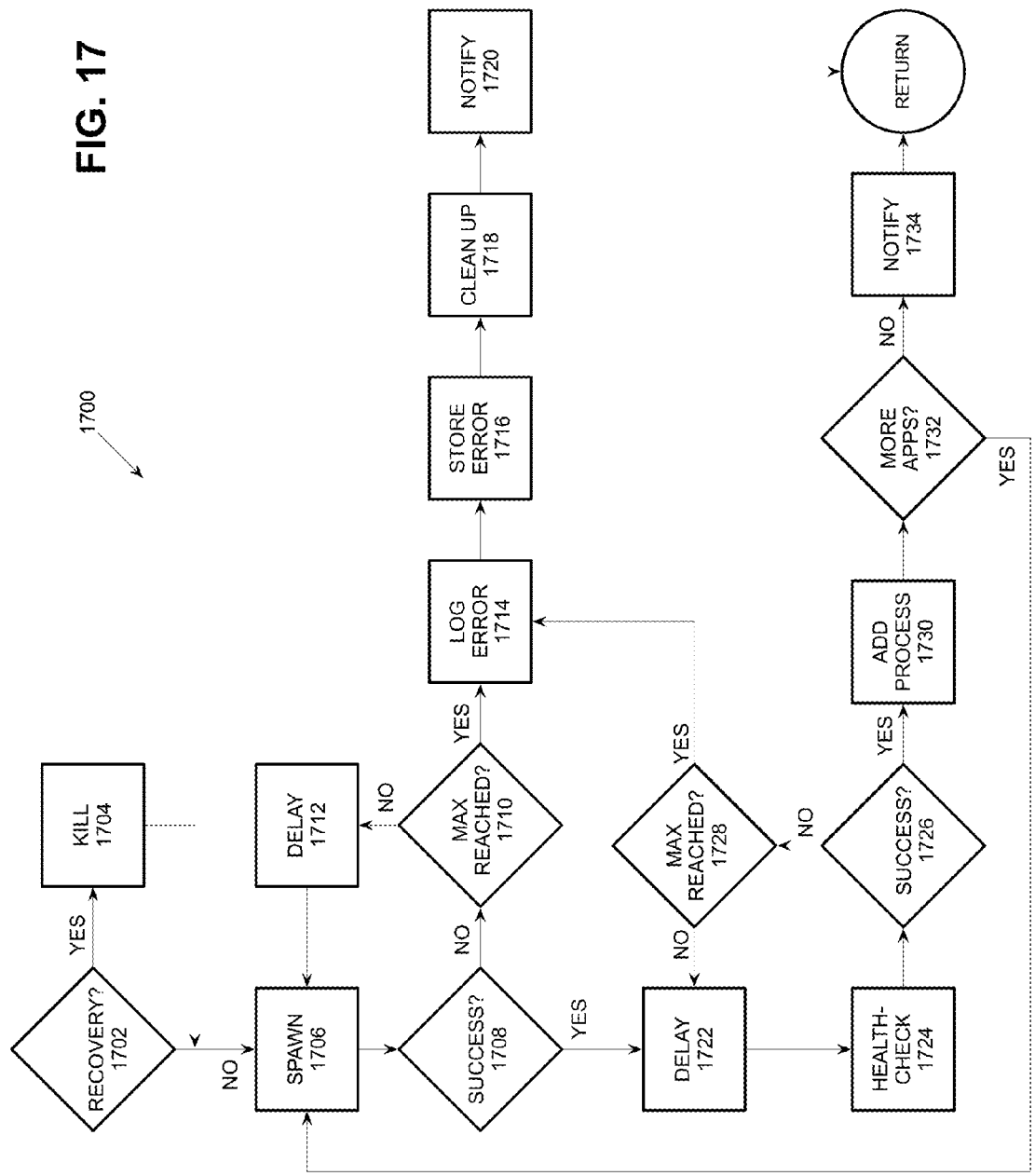
FIG. 17 is a flow diagram of an exemplary process that is associated with the start applications block of FIG. 16.

FIG. 17 is a flow diagram of an exemplary process 1700 that is associated with the start applications block 1606 of process 1600. As shown, process 1700 may include supervisor 624 determining whether the current process 1700 is a recovery process resulting from a crash (block 1702). If the current process is a recovery process (block 1702: yes), supervisor 624 may examine a table of processes (which includes a list of live processes prior to the crash), and kill processes that are inconsistent with post-crash configurations (block 1704). In addition, supervisor 624 may obtain a list of processes that are to be started. Thereafter, supervisor 624 may proceed to block 1706. Returning to block 1702, if the current process is not a recovery process (block 1702: no), supervisor 624 may proceed to block 1706.

Supervisor 624 may spawn/start an application (block 1706). If supervisor 624 is unable to successfully spawn the application (block 1708: no), supervisor 624 may determine whether supervisor 624 has reached the maximum number of tries to spawn/start the application (block 1710). If supervisor 624 has not reached the maximum number of tries (block 1710: no), supervisor 624 may wait/delay for a period of time (block 1712), and return to block 1706, to retry to spawn the application. If supervisor 624 has reached the maximum number of tries (block 1710: yes), supervisor 624 may log an error (block 1714). Furthermore, supervisor 624 store the error in a database (block 1716). Supervisor 624 may then perform a cleanup, by killing all spawned applications and processes, except for network management related applications/processes and by updating the table of processes/applications (block 1718). Supervisor 624 may notify a user interface or another component of the error (block 1720). Thereafter, supervisor 624 may return to the point in process 1600 from which supervisor 624 entered process 1700.

Returning to block 1708, if supervisor is able to successfully spawn the application (block 1708: yes), supervisor 624 may delay or wait for a period of time (block 1722), and perform a health check on the spawned application (block 1724). If an health check is a failure (e.g., a spawned application does not respond to the health check) (block 1726: no), supervisor 624 may determine whether the maximum number of health checks have been performed (block 1728). If supervisor 624 has not reached the maximum number (block 1728: no), supervisor 624 may return to block 1722, to eventually attempt another health check. If supervisor 624 has reached the maximum number of health checks (block 1728: yes), supervisor 624 may proceed to block 1714, to log an error (block 1714).

Returning to block 1726, if the health check is a success (block 1726: yes), supervisor 624 may add the name of the process to the process/application table (block 1730), and determine whether there are additional applications to spawn (block 1732). If there are additional applications to spawn (block 1732: yes), supervisor 624 may return to block 1706. Otherwise (block 1732: no), supervisor 624 may notify a user interface that supervisor 624 and applications are up or alive (block 1734). Supervisor 624 may return to the point in process 1600 from which supervisor 624 entered process 1700.

Figure 18:
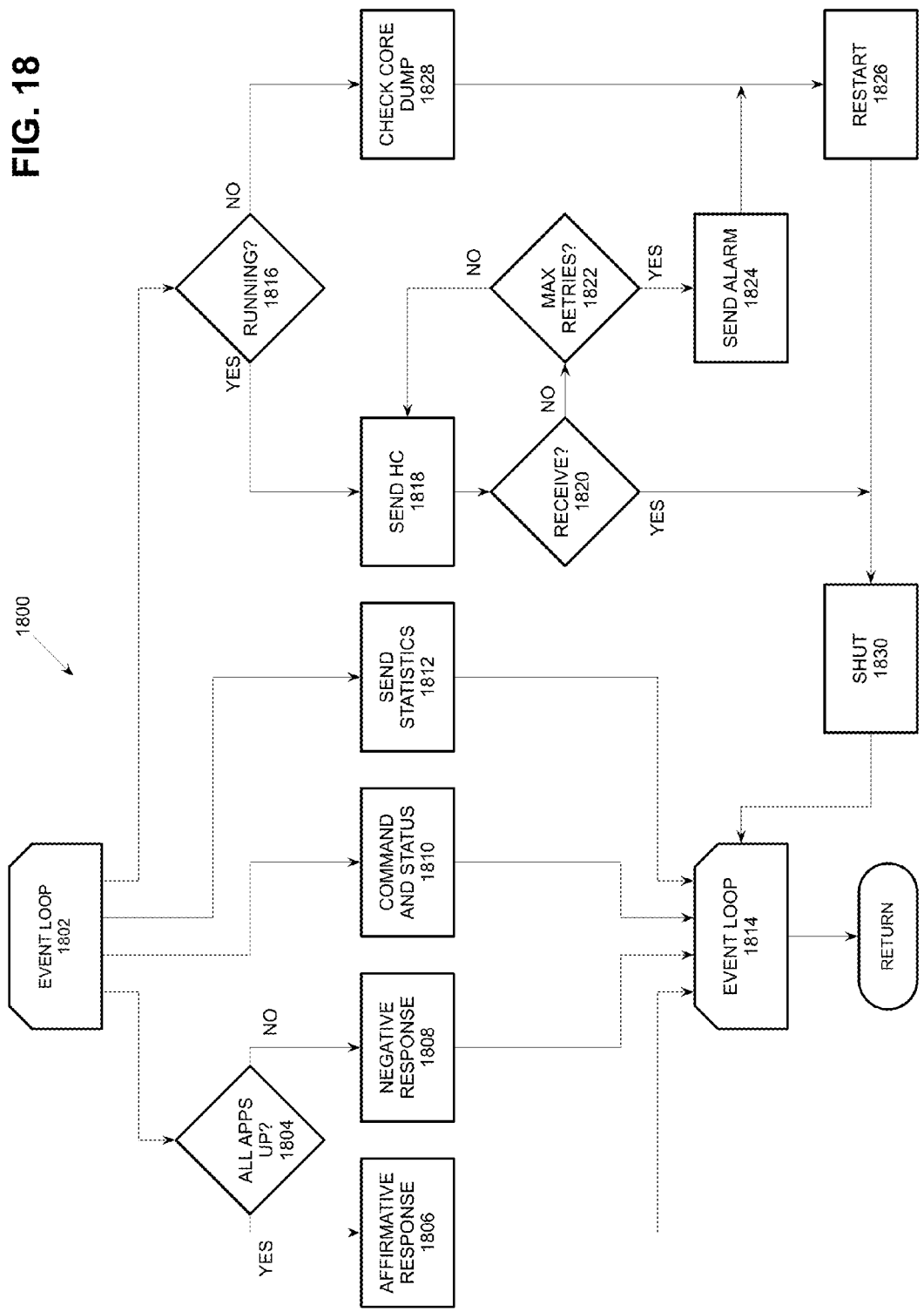
FIG. 18 is a flow diagram of an exemplary process that is associated with the running state block of FIG. 16.

FIG. 18 is a flow diagram of an exemplary process 1800 that is associated with the running state block 1610. As shown, the event loop has a starting point of loop 1802 and an end point of loop 1814. Supervisor 624 may continue to repeat the actions that are associated with blocks between the block 1802 and 1814.

Process 1800 may include supervisor 624 determining whether all applications are running/up (block 1804). The determination may begin when supervisor 624 receives a health check request from another system/application, such as a transaction services management system 310. If all applications are up (block 1804: yes), supervisor 624 may respond to the health check request with an affirmative response (e.g., HTTP 200 response) (block 1808). Otherwise (block 1804: no), supervisor 624 may respond with a negative response (e.g., HTTP 503 response) (block 1806). Thereafter, supervisor 624 may reach block 1814.

Process 1800 may also include supervisor 624 processing a command and status request (block 1810). Supervisor 624 may have received the request from a user or another system (e.g., transaction services tools system 330) and then reach block 1814.

Process 1800 may also include sending application statistics to a statistics application (block 1812). Supervisor 624 may perform block 1812 when a status timer notifies supervisor application 624 that supervisor application 624 is to forward the collected statistics to predetermined destinations. Supervisor 624 may proceed to block 1814.

Process 1800 may also determine whether a particular application is running (block 1816) when a health check timer for the application notifies supervisor 624 to send a health check message to the application. If the application is still running (block 1816: yes), supervisor 624 may send a health check message to the application (block 1818).

Supervisor application 624 may determine whether supervisor 624 has received a response to the health check message (block 1820). If the health check response has been received (block 1820: yes), supervisor 624 may determine the application is shut from accepting new calls (block 1830). When more than a certain percentage of applications on the blade on which supervisor 624 is installed stop running, supervisor 624 may shut the remaining applications on the blade from accepting calls/communications. Thereafter, supervisor 624 may reach block 1814.

If supervisor 624 has not received a response to the health check (block 1820: no), supervisor 624 may determine whether supervisor 624 reached the maximum number of health checks (block 1822). If supervisor 624 has reached the maximum number of health checks (block 1822: no), supervisor 624 may return to block 1818, to send another health check message. If supervisor 624 has reached the maximum number of health checks (block 1822: yes), supervisor 624 may generate/send an alarm to alarm server 255 (block 1824). Thereafter, supervisor 624 may restart the application (block 1826), and proceed to block 1830.

Returning to block 1816, if supervisor 624 determines that the application is not running (block 1816: no), supervisor 624 may identify a core dump of the application and save the core dump (block 1828). Supervisor 624 may restart the application (block 1826).

As described herein, transaction services data system 300 may include one or more devices within a transaction services hub 230. Transaction services data system 300 may relay messages from/to transaction devices 120 to transaction services customers (e.g., payment processor 130, customer host 602, etc.) and provide support functions that are related to relaying the messages.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While a series of blocks has been described with regard to the processes illustrated in FIGS. 9 through 14 and 16 through 18, the order of the blocks in the processes may be modified in other implementations. Depending on the implementation, each of the processes may include additional, fewer, different, or differently arranged blocks than those illustrated in FIGS. 9-14 and 16-18. Further, non-dependent blocks the processes may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A device comprising:
   a transaction web server configured to:
      receive a hypertext transfer protocol (HTTP) message that includes information sent from a transaction device;
      determine whether the message is a request to authorize a transaction or a request to settle the transaction;
      route a first portion of the HTTP message to a customer device to obtain an authorization from the customer device when the HTTP message is a request to authorize the transaction; and
      route a second portion of the HTTP message to the customer device to settle the transaction when the HTTP message is a request to settle the transaction,
   wherein, the transaction web server, when routing the first portion of the HTTP message to the customer device, is further configured to forward the first portion of the HTTP message to gateway applications, and
   wherein the gateway applications are configured to:
      receive the first portion of the HTTP message;
      perform a lookup of a destination address of the customer device based on information provided in the first portion of the HTTP message; and
      send a portion of the first portion to the customer device.

2. The device of claim 1, wherein the gateway applications are further configured to:
   establish a socket connection to the customer device.

3. The device of claim 1, wherein the gateway applications are further configured to:
   send an acknowledgment message to the transaction web server, wherein the acknowledgement message indicates that the gateway applications are connected to the customer device.

4. The device of claim 1, wherein the gateway applications, when sending the portion of the first portion to the customer device, are further configured to:
   send the portion of the first portion to the customer device in accordance with Visa II protocol.

5. The device of claim 1, wherein the gateway applications are further configured to:
   receive a reply from the customer device, wherein the reply indicates whether the transaction is authorized; and
   forward the reply to the transaction device.

6. The device of claim 1, wherein the gateway applications are further configured to:
   send an end-of-text (EOT) message to the transaction web server when the gateway applications are unable to establish a connection to the customer device.

7. The device of claim 1, wherein the transaction web server, when routing the second portion of the HTTP message to the customer device, is further configured to:
   forward the second portion of the HTTP message to the gateway applications, and
   wherein the gateway applications are further configured to:
      receive the second portion of the HTTP message; and
      send a portion of the second portion of the HTTP message to the customer device.

8. The device of claim 7, wherein the transaction web server is further configured to:
   determine whether a first byte of the second portion indicates at least one of:
      a start of text;
      an acknowledgment;
      a bell;
      a synchronization; or
      a negative acknowledgment, and
   wherein the transaction web server is further configured to:
      determine, when the first byte of the second portion indicates the acknowledgment, whether the acknowledgment is correctly ordered among a series of messages received from the gateway applications.

9. The device of claim 1, further comprising:
   a supervisor application configured to at least one of:
      configure at least one of the transaction web server or the gateway applications;
      start one or more of the transaction web server or the gateway applications; or
      send health check messages to the gateway applications.

10. The device of claim 9, wherein the supervisor application, when starting the one or more of the transaction web server or the gateway applications, is further configured to:
    determine that the supervisor application is recovering from a crash;
    identify one or more of the gateway applications that are active when the supervisor application crashed;
    terminate the one or more of the gateway applications while the supervisor application is recovering from a crash; and
    spawn the one or more of the gateway applications after the supervisor application has recovered from the crash.

11. The device of claim 10, wherein the supervisor application is further configured to:
    perform health checks on the spawned one or more of the gateway applications; and
    include identifiers for the spawned one or more of the gateway applications in a list of alive applications.

12. A method comprising:
    receiving by a processor associated with a transaction web server, a hypertext transfer protocol (HTTP) message that includes information sent from a transaction device;
    determining, by the processor, whether the message is a request to authorize a transaction or a request to settle a transaction;
    routing, by the processor, a first portion of the HTTP message to a customer device to obtain an authorization from the customer device when the HTTP message is a request to authorize the transaction, wherein routing the first portion of the HTTP message includes:
       forwarding the first portion of the HTTP message to gateway applications, wherein the gateway applications receive the first portion of the HTTP message, perform a lookup of a destination address of the customer device based on information provided in the first portion of the HTTP message, and send a portion of the first portion to the customer device based on the destination address; and routing, by the processor, a second portion of the HTTP message to the customer device to settle the transaction when the HTTP message is a request to settle a transaction.

13. The method of claim 12, further comprising:
receiving, from the gateway applications, an acknowledgement message, wherein the acknowledgement message indicates that the gateway applications are connected to the customer device.

14. The method of claim 12, further comprising:
receiving, via the gateway applications, a reply sent from the customer device, wherein the reply indicates whether the transaction is authorized.

15. The method of claim 12, wherein routing the second portion of the HTTP message to the customer device includes:
forwarding the second portion of the HTTP message to the gateway applications, wherein the gateway applications establish a connection to the customer device and forward portion of the second portion of the HTTP message to the customer device via the connection.

16. The method of claim 12, wherein the first portion and the second portion are different,
wherein the first portion of the HTTP message includes information identifying at least one of a user or a user device associated with the transaction, and
wherein the second portion of the HTTP message includes information about the transaction.

17. A non-transitory computer-readable medium to store instructions, the instructions comprising:
one or more instructions that, when executed by a processor associated with a transaction web server, cause the processor to:
receive a hypertext transfer protocol (HTTP) message that includes information sent from a transaction device;
determine whether the message is a request to authorize a transaction or a request to settle a transaction;
route a first portion of the HTTP message to a customer device to obtain an authorization from the customer device when the HTTP message is a request to authorize the transaction, wherein gateway applications receive the first portion of the HTTP message, perform a lookup of a destination address of the customer device based on information provided in the first portion of the HTTP message, and send a portion of the first portion to the customer device based on the destination address; and
route a second portion of the HTTP message to the customer device to settle the transaction when the HTTP message is a request to settle a transaction.

18. The non-transitory computer-readable medium of claim 17, wherein the one or more instructions further cause the processor, when routing the second portion of the HTTP message to the customer device, to:
forward the second portion of the HTTP message to the gateway applications, wherein the gateway applications establish a connection to the customer device and forward a portion of the second portion of the HTTP message to the customer device via the connection.

19. The non-transitory computer-readable medium of claim 18, wherein the one or more instructions further cause the processor, when forwarding the second portion of the HTTP message to the customer device via the connection, to:
extract an acknowledgment from the second portion,
determine whether the acknowledgment is correctly ordered among a series of messages received from the gateway applications, and
resend the second portion if the acknowledgment is incorrectly ordered among the series of messages received from the gateway applications.

20. The non-transitory computer-readable medium of claim 17, wherein the instructions further comprise:
one or more instructions that, when executed by a supervisor application coupled to the transaction web server, cause the supervisor application to:
determine that the supervisor application is recovering from a crash,
identify one or more of the gateway applications that are active when the supervisor application crashed;
terminate the one or more of the gateway applications while the supervisor application is recovering from a crash; and
restart the one or more of the gateway applications after the supervisor application has completed recovering from the crash.

* * * * *